United States Patent
Lu et al.

(10) Patent No.: US 10,321,542 B1
(45) Date of Patent: **\*Jun. 11, 2019**

(54) HEURISTIC OCCUPANCY AND NON-OCCUPANCY DETECTION IN A LIGHTING SYSTEM WITH MULTIPLE TRANSMITTERS AND A SINGLE RECEIVER

(71) Applicant: ABL IP HOLDING LLC, Conyers, GA (US)

(72) Inventors: Min-Hao Michael Lu, Castro Valley, CA (US); Michael Miu, Castro Valley, CA (US); Eric J. Johnson, San Francisco, CA (US)

(73) Assignee: ABL IP Holding LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,827

(22) Filed: Dec. 13, 2017

(51) Int. Cl.
| | |
|---|---|
| *H04W 4/70* | (2018.01) |
| *H04W 84/18* | (2009.01) |
| *H04W 4/80* | (2018.01) |
| *H04W 84/12* | (2009.01) |
| *H05B 37/02* | (2006.01) |
| *H04B 17/318* | (2015.01) |

(52) U.S. Cl.
CPC ....... *H05B 37/0227* (2013.01); *H04B 17/318* (2015.01); *H04W 4/70* (2018.02); *H04W 84/18* (2013.01); *H05B 37/0272* (2013.01); *H04W 4/80* (2018.02); *H04W 84/12* (2013.01)

(58) Field of Classification Search
CPC ............ H05B 37/0227; H05B 37/0272; H05B 33/0854; H04B 17/318; H04W 4/80; H04W 84/12
See application file for complete search history.

(56) References Cited

U.S. PATENT DOCUMENTS 9,474,042 B1 * 10/2016 Wootton .............. H04W 64/00
9,986,623 B1 * 5/2018 Miu .................... H05B 37/0227
(Continued)

OTHER PUBLICATIONS

Nordic Semiconductor: nRF51822—Multi-protocol Bluetooth Low Energy and 2.4GHz proprietary system-on-a chip, document printed Aug. 10, 2017 (2 pages).
(Continued)

*Primary Examiner* — Alexander H Taningco
*Assistant Examiner* — Renan Luque
(74) *Attorney, Agent, or Firm* — RatnerPrestia

(57) ABSTRACT

Disclosed herein is a lighting system configured to obtain an indicator data of a RF spectrum signal generated at a number of times in an area. At each respective one of the number of times, apply one of a plurality of heurist algorithm coefficients to each indicator data from a receiver for the respective time, based on results of the applications of the coefficients to indicator data, generate an indicator data metric value for each of the indicator data for the respective time, and process the indicator data metric values to compute an output value. The lighting system is further configured to compare the output value at each of the plurality of times with a threshold to detect one of an occupancy condition or a non-occupancy condition in the area and control the light source in response to the detected one of the occupancy condition or the non-occupancy condition in the area at each of the number of times.

30 Claims, 13 Drawing Sheets

(56) References Cited

U.S. PATENT DOCUMENTS

| | | | |
|---|---|---|---|
| 10,109,167 B1* | 10/2018 | Olekas | H04W 4/70 |
| 2014/0066060 A1* | 3/2014 | Ngai | H04W 48/16 |
| | | | 455/434 |
| 2014/0117859 A1 | 5/2014 | Swatsky et al. | |
| 2014/0119160 A1 | 5/2014 | Shilling et al. | |
| 2014/0265568 A1 | 9/2014 | Crafts et al. | |
| 2015/0189726 A1 | 7/2015 | Spira | |
| 2015/0326680 A1* | 11/2015 | Farahani | H04W 4/029 |
| | | | 706/12 |
| 2015/0346702 A1 | 12/2015 | Camden et al. | |
| 2016/0057799 A1* | 2/2016 | Cedo Perpinya | H04W 8/005 |
| | | | 455/41.2 |
| 2016/0294492 A1* | 10/2016 | Mostofi | H04B 17/318 |
| 2018/0114115 A1 | 4/2018 | Liang et al. | |

OTHER PUBLICATIONS

Non Final Office Action for U.S. Appl. No. 15/840,694, dated Sep. 6, 2018, 21, pages.
Non Final Office Action for U.S. Appl. No. 15/840,616, dated Oct. 4, 2018, 36 pages.
Notice of Allowance for U.S. Appl. No. 15/840,694, dated Feb. 7, 2019, 14 pages.
Notice of Allowance for U.S. Appl. No. 15/840,616, dated Feb. 13, 2019, 18 pages.

* cited by examiner

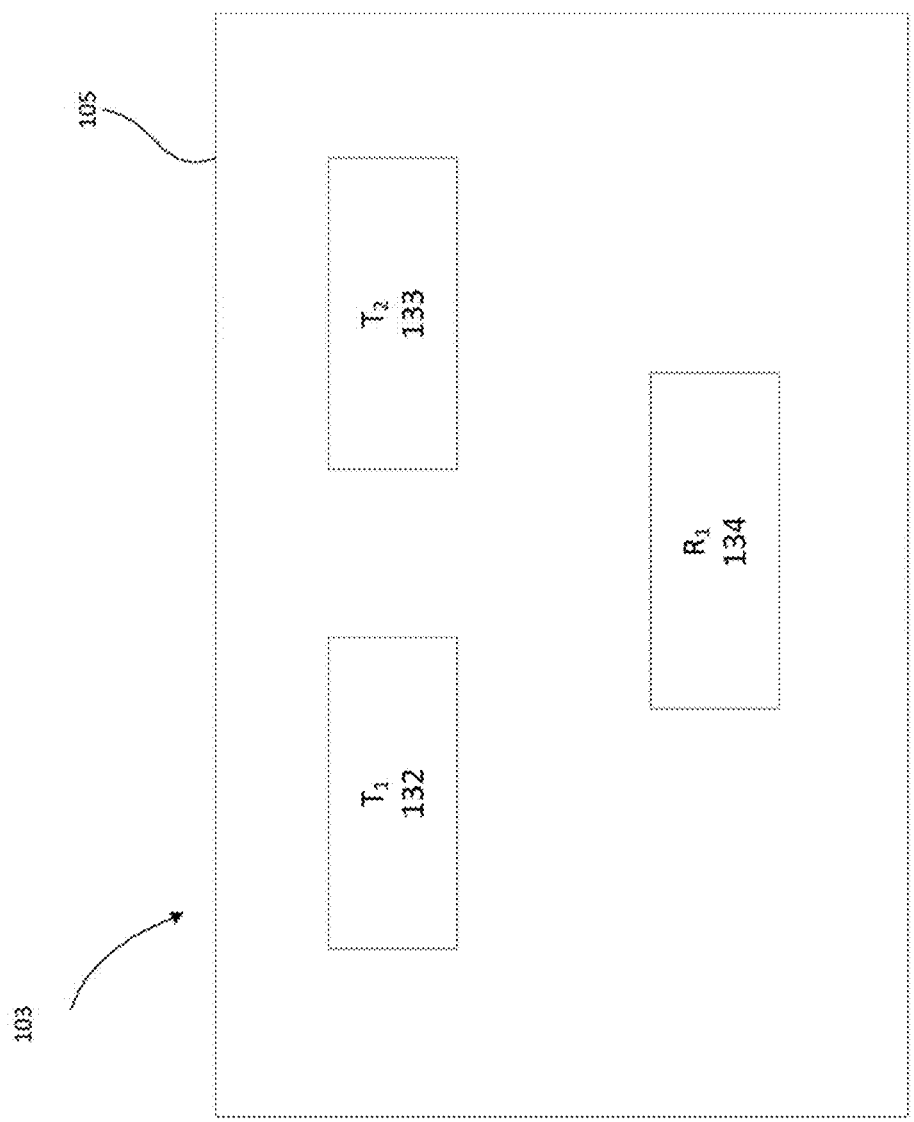

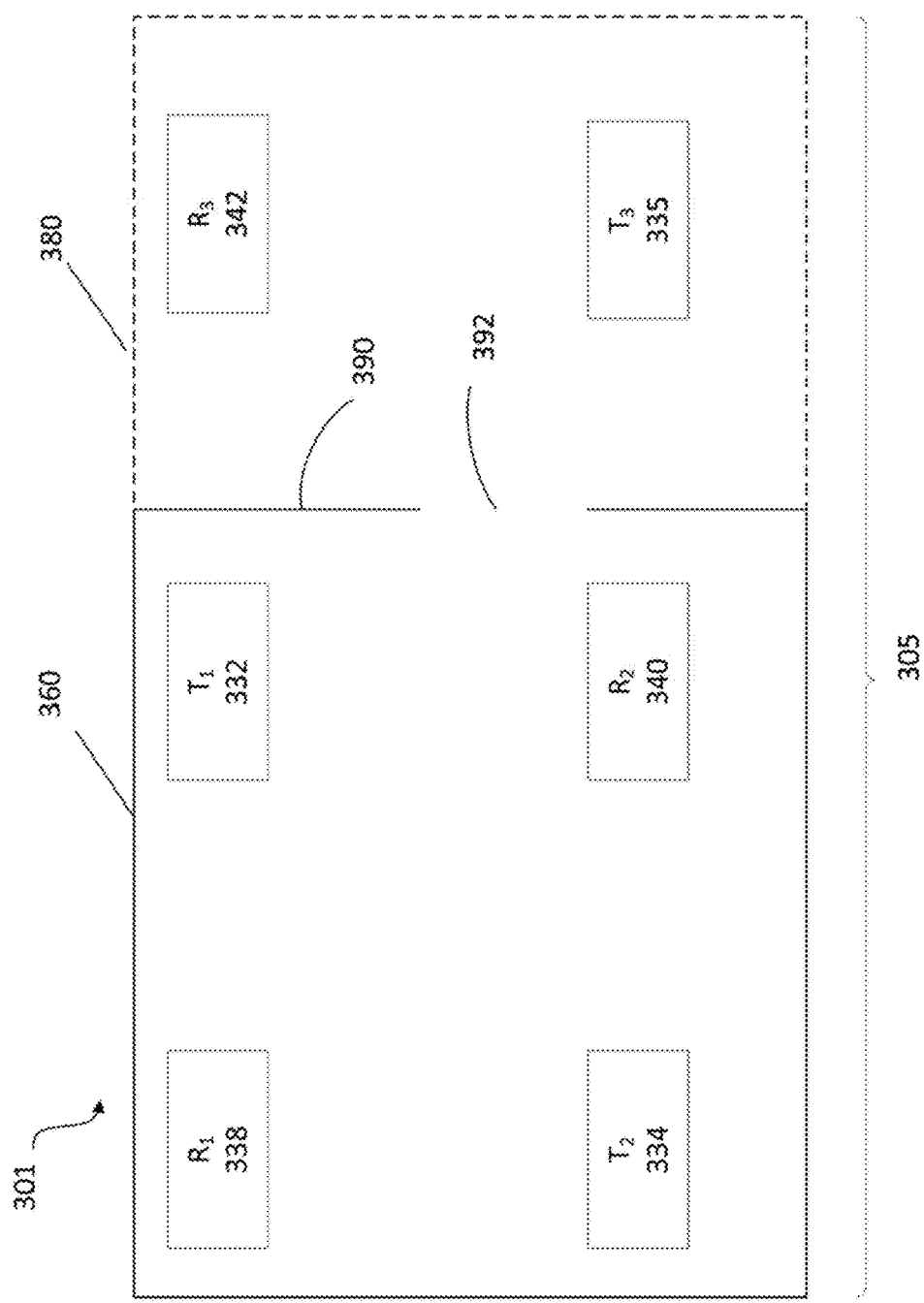

HEURISTIC OCCUPANCY AND NON-OCCUPANCY DETECTION IN A LIGHTING SYSTEM WITH MULTIPLE TRANSMITTERS AND A SINGLE RECEIVER

CROSS REFERENCE TO RELATED APPLICATIONS

This application is related to U.S. patent application Ser. No. 15/840,616, filed Dec. 13, 2017, entitled "Heuristic Occupancy and Non-Occupancy Detection in a Lighting System." This application is also related to U.S. patent application Ser. No. 15/840,694, filed Dec. 13, 2017, entitled "Heuristic Occupancy and Non-Occupancy Detection in a Lighting System with a Single Transmitter and Multiple Receivers."

BACKGROUND

In recent years, a number of systems and methods have been proposed for occupancy detection within a particular area utilizing radio frequency (RF) based technologies. Examples of such systems include video sensor monitoring systems, radio frequency identification (RFID) systems, global positioning systems (GPS), and wireless communication systems among others. However, many of these systems have several disadvantages. For example, the video sensor monitoring system requires a considerable number of dedicated sensors that are expensive and the system requires a large amount of memory for storing data. The RFID systems rely on occupants carrying an RFID tag/card that can be sensed by the RFID system to monitor the occupants. The GPS system uses orbiting satellites to communicate with the terrestrial transceiver to determine a location of the occupant in the area. However, such systems are generally less effective indoors or in other environments where satellite signals may be blocked, reducing accuracy of detecting the occupant in the area.

Electrically powered artificial lighting has become ubiquitous in modern society. Since the advent of electronic light emitters, such as lighting emitting diodes (LEDs), for general lighting type illumination application, lighting equipment has become increasingly intelligent with incorporation of sensors, programmed controller and network communication capabilities. Automated control, particularly for enterprise installations, may respond to a variety of sensed conditions, such as a daylight or ambient light level or occupancy. Commercial grade lighting systems today utilize special purpose sensors and related communications.

There also have been proposals to detect or count the number of occupants in an area based on effects on an RF signal received from a transmitter due to the presence of the occupant(s) in the area. These RF wireless communication systems generally detect an occupant in the area based on change in signal characteristics of a data packet transmitted over the wireless network. However, an inaccurate detection of the occupant in a region or a sub-area in the area can occur when multiple transmitters are transmitting the RF signals from multiple different regions/sub-areas of the area.

SUMMARY

The examples disclosed herein improve over RF-based sensing technologies by heuristically detecting one or more occupants in a space. In such examples, occupancy is sensed based on measurements of RF perturbations in an area or space. An example machine learning algorithm involves determining optimized heuristic algorithm coefficients associated with the RF perturbations to provide occupancy sensing in the area at a time. The optimized heuristic algorithm coefficients are utilized in the example machine learning algorithm to provide the occupancy sensing in the area at real time. In one example, prior to the real time detection, learning occurs to optimize the coefficients, for example, prior to shipping of a product or as part of commissioning. In another example, learning occurs in real time operation, thus resulting in an on-going learning process to further optimize the coefficients.

An example lighting system includes a light source and a plurality of wireless communication transmitters for wireless radio frequency (RF) spectrum transmissions in an area, including RF spectrum transmissions at a plurality of times. The lighting system also includes a wireless communication receiver configured to receive RF spectrum signals of transmissions from each of the plurality of transmitters through the area at the plurality of times. The receiver is configured to generate an indicator data of a signal characteristic of the received RF spectrum signal from each of the plurality of transmitters at each of the plurality of times. The lighting system also includes a control module coupled to the light source and coupled to obtain the indicator data of RF spectrum signals generated at each of the plurality of times from the receiver. At each respective one of the plurality of times, the control module is configured to apply one of a plurality of heurist algorithm coefficients to each indicator data from the receiver for the respective time, and based on results of the applications of the coefficients to indicator data, generate an indicator data metric value for each of the indicator data from the receiver for the respective time. At each respective one of the plurality of times, the control module is to process the indicator data metric values to compute an output value; and compare the output value at each of the plurality of times with a threshold to detect one of an occupancy condition or a non-occupancy condition in the area.

An example method includes obtaining, in a lighting system, an indicator data generated at each of a plurality of times from a receiver configured to receive radio frequency (RF) spectrum signals from a plurality of RF transmitters in an area. At each respective one of the plurality of times in the lighting system, the method also includes applying a plurality of heurist algorithm coefficients (coefficients) to each indicator data from the receiver for the respective time, based on results of the applications of the coefficients to indicator data, generating an indicator data metric value for each of the indicator data from the receiver for the respective time, and processing the indicator data metric values to compute an output value for the respective time. The method further includes comparing the output value for the respective time with a threshold to detect one of a one of an occupancy condition or a non-occupancy condition in the area.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 1B illustrates an example of a wireless topology of a lighting system with a single receiver and multiple transmitters.

FIG. 3 illustrates an example of a wireless topology of a lighting system with multiple transmitters and multiple receivers.

DETAILED DESCRIPTION

Figure 1A:
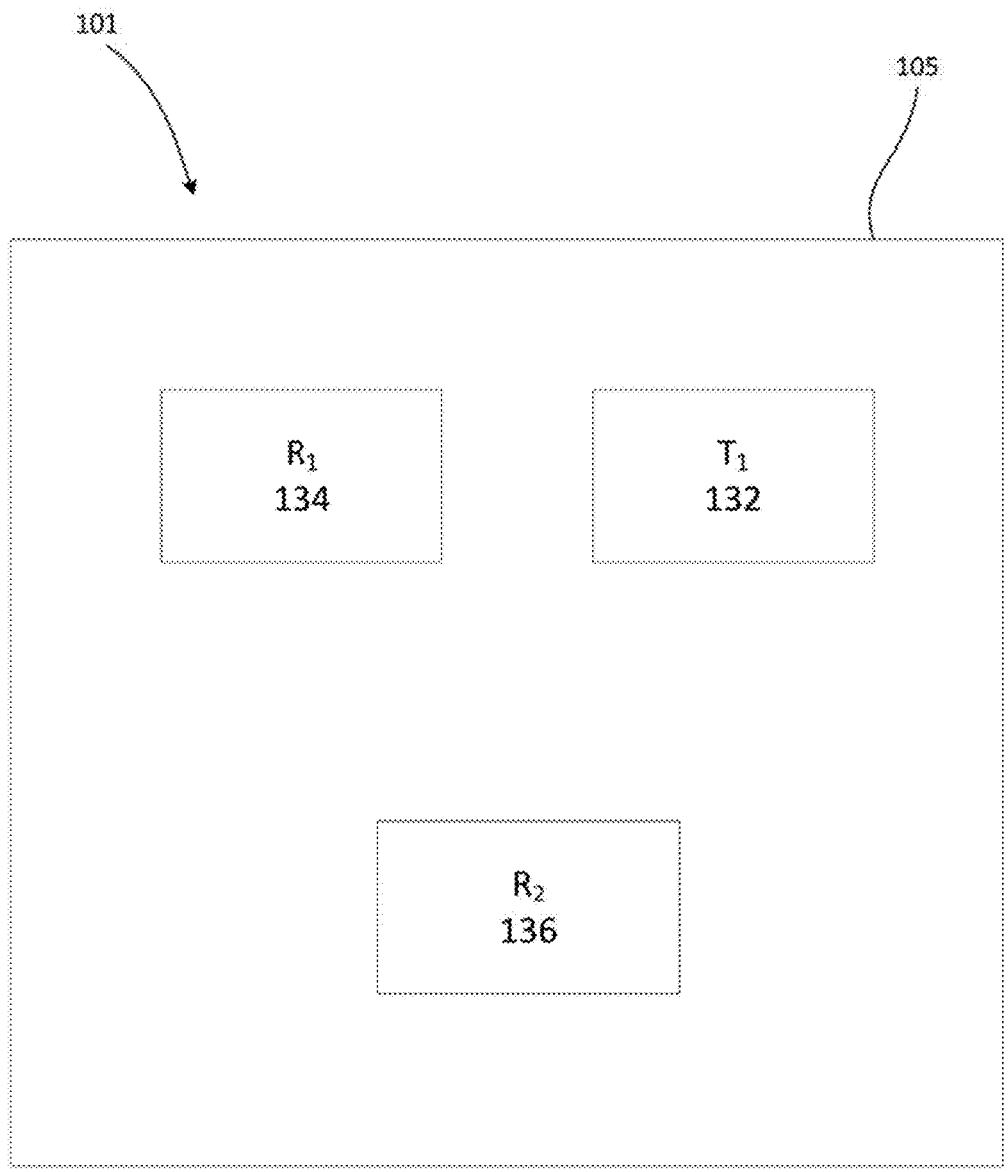
FIG. 1A illustrates an example of a wireless topology of a lighting system with a single transmitter and multiple receivers.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Although there have been suggestions to control lighting based on RF wireless detection results, prior RF-based detection systems have not themselves been integrated as part of a machine learning (ML) in a lighting system of which the lighting operation are controlled as a function of the detection.

There is also room for improvement in the RF wireless detection algorithms for lighting system control. For example, a ML algorithm in the lighting system may enable a more rapid and real time response so that an occupant entering a previously empty area perceives that the system instantly turns ON the light(s) in the area. As another example, the ML algorithm may offer improved detection accuracy, e.g. to reduce false positives in detecting an occupant in the area.

Further, there is room for improvement for accurate detection of the occupant in a sub-area among multiple different sub-areas of the area. False positives may occur when detecting an occupant in a specific sub-area when multiple transmitters are transmitting the RF signals from multiple different sub-areas of the area. For example, a ML algorithm may offer improved occupancy detection accuracy, e.g. to reduce false positives in detecting the occupant in the actual sub-area of interest in the facility.

The examples described below and shown in the drawings integrate RF wireless based ML occupancy/non-occupancy detection capabilities in one or more lighting devices or into lighting devices and/or other elements forming a lighting system. Examples of a detection system address some or all of the concerns noted above regarding rapid real time detection of changes in occupancy/non-occupancy status and/or improved detection performance, such as reduction or even elimination of false positive occupancy detections. These advantages and possibly other advantages may be more readily apparent from the detailed description below and illustration of aspects of the examples in the drawings.

Referring to FIG. 1A, an example of a wireless topology 101 of a lighting system includes a single wireless communication transmitter (Tx) and a number of wireless communication receivers (Rx) in physical space/area 105. In one implementation, an indoor environment is described, but it should be readily apparent that the systems and methods described herein are operable in external environments as well. Specifically, in this example, the area 105 is a room. In one implementation, although, not shown, the area 105 may also include corridors, additional rooms, hallways etc.

As illustrated in the example in FIG. 1A, the area 105 includes three intelligent system nodes 132, 134, 136. Each such system node has an intelligence capability to transmit a signal or receive a signal and process data. In one example, at least one system node includes a light source and is configured as a lighting device. In another example, a system node includes a user interface component and is configured as a lighting controller. In another example a system node includes a switchable power connector and is configured as a plug load controller. In a further example, a system node includes sensor detector and is configured as a lighting related sensor.

System node 132 includes a transmitter T1 and system nodes 134 and 136 includes receivers R1 and R2 respectively. In one implementation, one of the occupancy condition and the non-occupancy condition in the area 105 is detected according to a heuristic occupancy sensing procedure as will be described below with respect to FIG. 2A.

In the wireless topology 101, the T1 in the area 105 transmits a RF spectrum (RF) signal for some number (plurality >1) of times. The transmission may be specifically for the occupancy detection. Each of the receivers R1-R2 receives the transmissions of the RF signal through the area 105 for each of the plurality of times from T1. Accordingly, each of the R1 and R2 is configured to detect a metric of the received RF, which the system (e.g. at one or more of the nodes) uses to detect one of an occupancy condition and a non-occupancy condition based on the RF spectrum signals received from the T1 in the area 105.

Figure 2A:
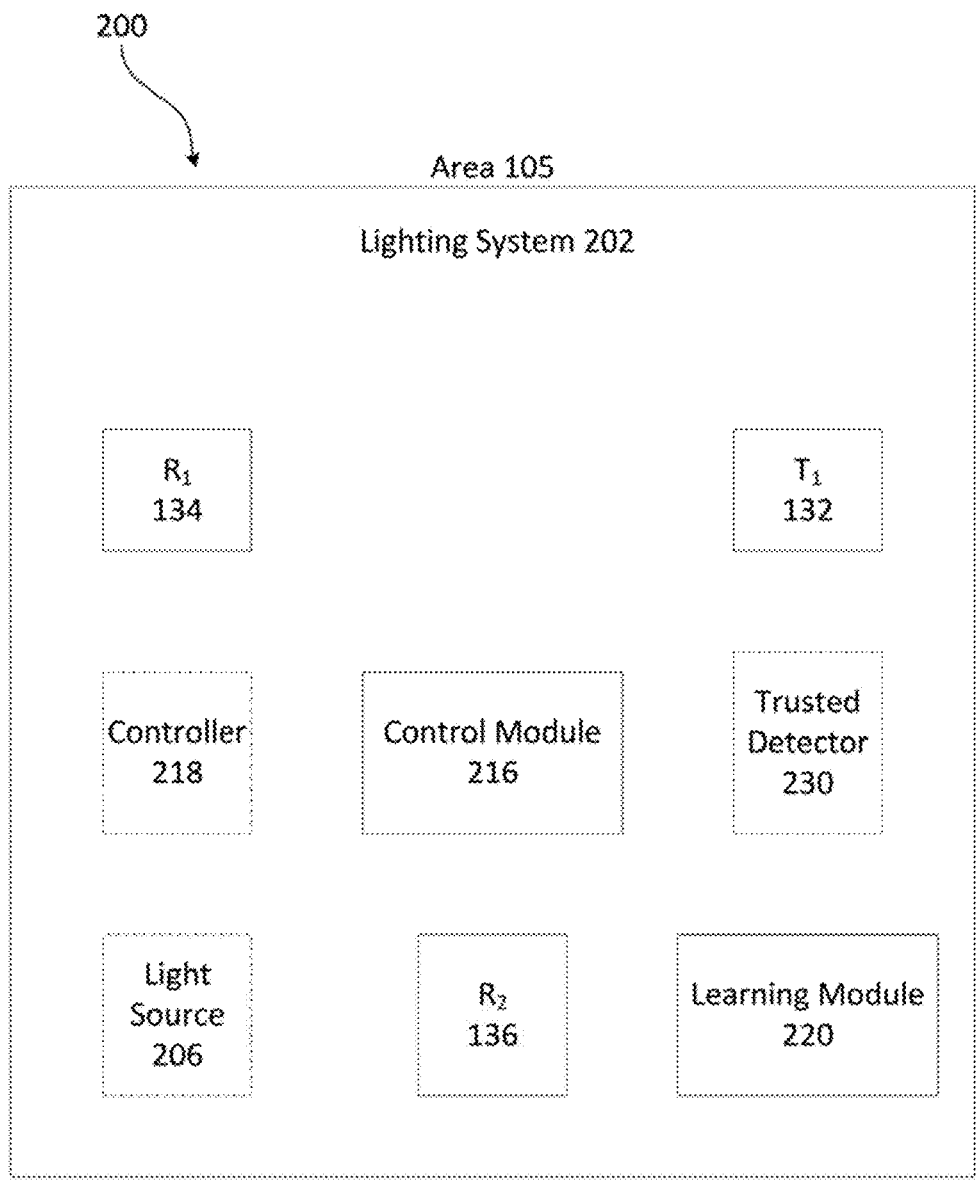
FIG. 2A is a functional block diagram illustrating an example of a heuristic occupancy sensing system based on the wireless topology of FIG. 1A in accordance with an implementation of a local control of a light source in a lighting system.

Referring to FIG. 2A, there is shown a functional block diagram of an example of a heuristic occupancy sensing system 200 configured to function on a radio frequency (RF) wireless communication network in accordance with an implementation of a local control of a light source in a lighting system. As illustrated, the heuristic occupancy sensing system 200 includes a lighting system (system) 202 disposed within the physical space/area 105 such as a room, corridor, etc. as described above with respect to FIG. 1A. In one implementation, an indoor environment is described, but it should be readily apparent that the systems and methods described herein are operable in external environments as well.

In one implementation, the system 202 includes the three intelligent system nodes 132, 134 and 136 as described with respect to FIG. 1A above. As discussed above, each such system node has an intelligence capability to transmit and receive data and process the data. Each system node, for example, may include a receiver (R) and/or a transmitter (T) along with another component used in lighting operations. In one example, a system node includes a light source and is configured as a lighting device. In another example, a system node includes a user interface component and is configured as a lighting controller. In another example the system node includes a switchable power connector and is configured as a plug load controller. In a further example, a system node includes sensor detector and is configured as a lighting related sensor. The system node 132 includes a T1, and each of the system nodes 134 and 136 includes a R1 or R2 respectively.

As described above, the Tx is configured to transmit RF signals and each of the Rx is configured to receive signals from the Tx. In one implementation, the system 202 includes a light source 206, and a system node containing the source 206 or coupled to and operating together with the source 206 is configured as lighting device. The lighting device, for example, may take the form of a lamp, light fixture, or other luminaire that incorporates the light source, where the light source by itself contains no intelligence or communication capability, such as one or more LEDs or the like, or a lamp (e.g. "regular light bulbs") of any suitable type. The light source 206 is configured to illuminate some or all of the area 105. In one example, each of some number of individual light sources 206 to illuminate portion(s) or sub-area(s) of the area 105. Typically, a lighting system will include one or more other system nodes, such as a wall switch, a plug load controller, or a sensor.

In one implementation, the lighting system includes a control module 216 coupled to the receivers R1 and R2. In one implementation, the control module is coupled to the light source 206. In an alternate implementation, the control module 216 is coupled to the light source 206 via a network (not shown). In another alternate implementation, the control module 216 is coupled to the lighting system 202 via a network (not shown). In one implementation, the control module 216 is implemented in firmware of a processor configured to determine one of an occupancy condition or a non-occupancy condition in the area 105, although other circuitry or processor-based implementations may be used. In one implementation, the control module 216 is implemented in firmware of the processor in the R1 and/or R2.

In one implementation, the system 202 includes a controller 218 coupled to the control module 216. In one implementation the controller 218 may be the same or an additional processor configured to control operations of elements in the system 202 in response to determination of one of the occupancy condition or the non-occupancy condition in the area 105. For example, in an alternate implementation, when the system 202 includes a light source 206, the controller 218 is configured to process a signal to control operation of the light source 206. In one alternate implementation, the controller 218 is configured to turn ON the light source 206 upon an occupancy condition detected by the control module 216. In one implementation, the controller 218 is configured to turn OFF the light source 206 upon a non-occupancy condition detected by the control module 216. In another implementation, upon the detection of the occupancy or non-occupancy condition in the area 105, the controller 218 may be configured to provide other control and management functions in the area such as heating, ventilation and air conditioning (HVAC), heat mapping, smoke control, equipment control, security control, etc. instead of or in addition to control of the light source(s). In yet another implementation, the controller 218 communicates the occupancy condition or non-occupancy condition to the lighting network via a data packet. The data packet is received by one or more luminaires in the lighting network, which are configured to turn ON or OFF the light source(s) 206 based on the occupancy or the non-occupancy condition respectively provided in the data packet. The luminaire or another node on the lighting network may receive the packet and respond to provide automation of other energy control, equipment control, operational control and management systems (e.g. HVAC, heat mapping, smoke control, equipment control and security control) in the area. Accordingly, the occupancy sensing system 200 communicates the occupancy/non-occupancy condition with other networks. In another alternate implementation, the controller 218 is coupled to the lighting system 202 via a network (not shown). Accordingly, the heuristic occupancy sensing system 200 is configured to function on the RF wireless communication network in accordance with an implementation of a global control of a light source, as well as other automation control of energy, equipment, operational and management, as discussed above, of the area in a lighting system.

In one implementation, the system nodes typically include a processor, memory and programming (executable instructions in the form of software and/or firmware). Although the processor may be a separate circuity (e.g. a microprocessor), in many cases, it is feasible to utilize the central processing unit (CPU) and associated memory of a micro-control unit (MCU) integrated together with a transceiver in the form of a system on a chip (SOC). Such an SOC can implement the wireless communication functions as well as the intelligence (e.g. including any detector or controller capabilities) of the system node.

In examples discussed in more detail later, system nodes often may include both a transmitter and a receiver (sometimes referenced together as a transceiver), for various purposes. At times, such a transceiver-equipped node may use its transmitter as part of a heuristic occupancy sensing operation; and at other times such a transceiver-equipped node may use its receiver as part of a heuristic occupancy sensing operation. Such nodes also typically include a processor, memory and programming (executable instructions in the form of software and/or firmware). Although the processor may be a separate circuity (e.g. a microprocessor), in many cases, it is feasible to utilize the central processing unit (CPU) and associated memory of a micro-control unit (MCU) integrated together with physical circuitry of a transceiver in the form of a system on a chip (SOC). Such an SOC can implement the wireless communication functions as well as the intelligence (e.g. including any detector or controller capabilities) of the system node.

Figure 2B:
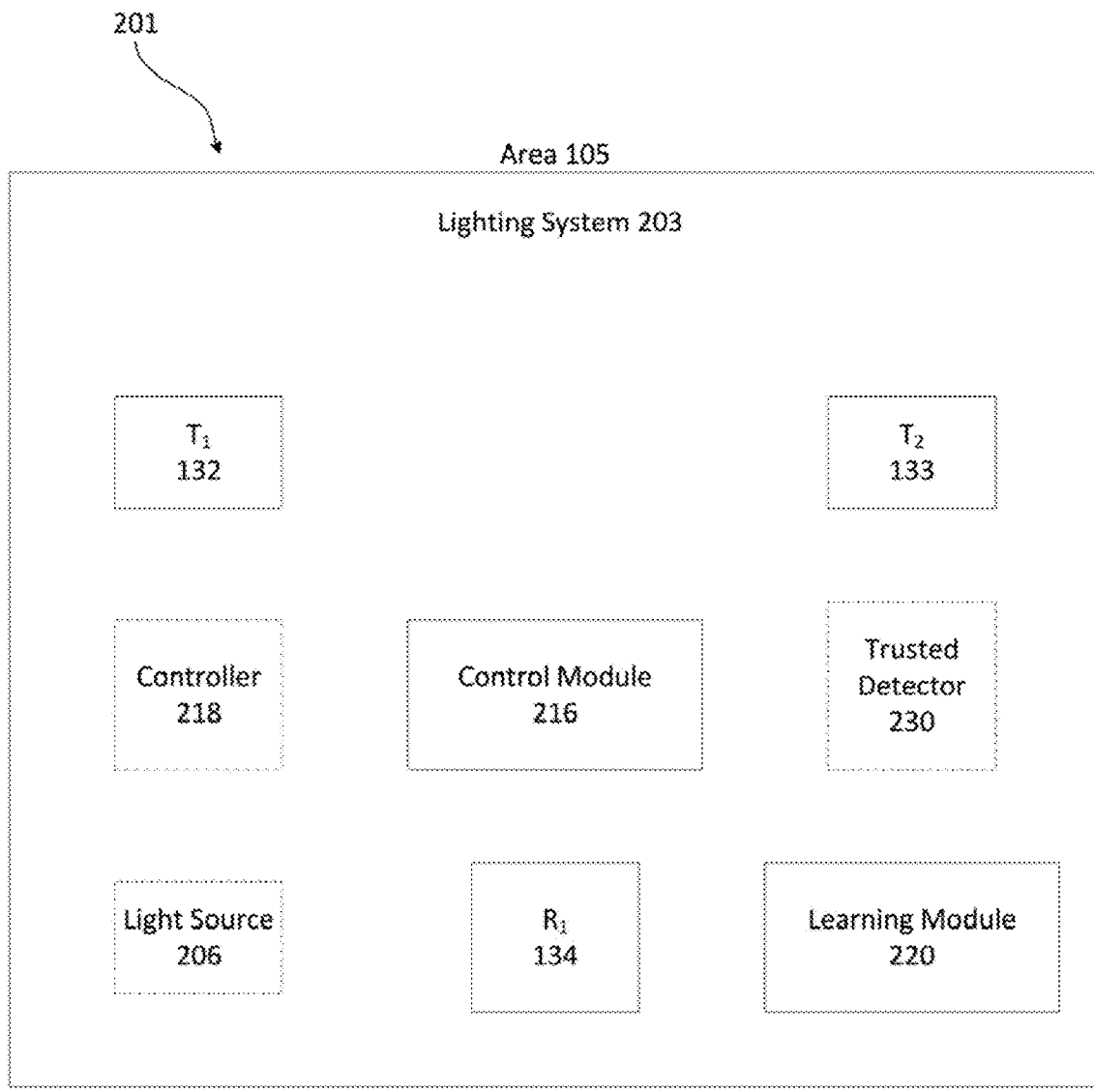
FIG. 2B is a functional block diagram illustrating an example of a heuristic occupancy sensing system based on the wireless topology of FIG. 1A in accordance with an implementation of a local control of a light source in a lighting system.

Although the system nodes 132, 134 and 136 of FIG. 2A illustrate an implementation of a single Tx and a single Rx in each of the nodes, the system 202 may include other implementations such as multiple Txs in one or more nodes (see e.g. FIG. 2B). Also, FIG. 2A illustrates the implementation of a single Rx in each of the nodes, the system 202 may include other implementations such as multiple Rx in one or more nodes. Further, the system 202 may include one or more Tx and one or more Rx in each of the nodes. In the illustrated implementation, the system 202 includes a single lighting device with one source 206, however, the system 202 may include multiple lighting devices 206a-206n (see e.g. FIG. 7) including one or more Tx and one or more Rx.

For discussion of an initial example of a heuristic RF-based occupancy sensing operation, assume that the system 202 includes just the elements shown in FIG. 1A. In one example, each of the system nodes 132, 134 and 136 includes the capabilities to communicate over two different RF bands, although the concepts discussed herein are applicable to devices that communicate with luminaires and other system elements via a single RF band. Hence, in the dual band example, the Tx/Rx may be configured for sending and receiving various types of data signals over one band, e.g. for the RF detection leading to occupancy detection. The other band may be used or for pairing and commissioning messages over another band and/or for communications related to detection of RF or higher level occupancy sensing functions, e.g. between receivers R1 and R2 and the controller 220 or the control module 216. For example, the Tx and Rx are configured as a 900 MHz transmitter and receiver for communication of a variety of system or user data, including lighting control data, for example, commands to turn lights on/off, dim up/down, set scene (e.g., a predetermined light setting), and sensor trip events. Alternatively, the Tx and Rx may be configured as a 2.4 GHz transmitter and receiver for Bluetooth low energy (BLE) communication of various messages related to commissioning and maintenance of a wireless lighting system.

In one implementation, benefits of the system include the ability to take advantage of Tx and the Rx (e.g. RF Tx and RF Rx) already installed in a location in the area 105, and because the system passively monitors signal broadcasts in the area 105 at a plurality of times, the heuristic occupancy detection functionality does not require (does not rely on) the occupants to carry any device.

At a high level, the T1 transmits a RF signal at a plurality of times. The transmission may be specifically for the occupancy detection. In some cases, however, where the transmitter is in another lighting device or other lighting system element (e.g. a sensor or a wall switch), the transmissions maybe regular lighting related communications, such as reporting status, sending commands, reporting sensed events, etc. Each of the R1-R2 receives the transmissions of the RF signal from the T1 through the area 105 during each of the plurality of times. Each of the R1-R2 generates an indicator data of one or more characteristics of the received RF signal at the plurality of times. Some of examples of the characteristics include but are not limited to received signal strength indicator (RSSI) data, bit error rate, packet error rate, phase change etc. or a combination of two or more thereof. The RSSI data represents measurements of signal strength of the received RF. The bit error rate is rate of incorrect bits in received RF signals versus total number of bits in the transmitted RF signals. The packet error rate is rate of incorrect packets in received RF signals versus total number of packets the transmitted RF signals. Phase change is a change of phase of a received RF signal compared to previous reception of the RF signal (typically measured between the antennas spaced apart from each other). For the purpose of the present description, we use RSSI data as the characteristics of the RF signal for processing by each of the R1-R2 to generate as the indicator data. Each of the R1-R2 measures the signal strength of the received RF signal and generates the RSSI data based on the signal strength. The signal strength of each of the RF signal is based whether an occupant exists in a path between each of the T1 and R1-R2 in the area 105.

For each time, each of the receivers R1-R2 supplied the generated indicator data of one or more characteristics of the received RF signal to the control module. In one implementation using RSSI as the characteristic of interest, the control module 216 obtains the generated RSSI data at each of the plurality of times from the various receivers R1-R2 and utilizes a heuristic algorithm to determine one of an occupancy condition or a non-occupancy condition in the area 105 as described in greater detail herein below.

In one implementation that takes advantage of the machine learning (ML) capability of the heurist algorithm, the system 202 includes a trusted detector 230, which provides a known value (similar to the "known answer" as discussed above). Input from the trusted detector 230 trusted detector 230 to "learn" so as to improve performance. The trusted detector 230 in the example may be a standard occupancy sensor, such as passive infrared occupancy detector, a camera based occupancy sensing system, BLE signal sensor (i.e. detecting presence of a phone), manual operation of lighting control (i.e. someone walking into a dark room turning on lights), microphone signal, voice command (a la Alexa), and any other signal or sensor data that can establish the presence of a person in the room. Specifically, the trusted detector 230 provides a known occupancy value for an accurate occupancy condition in the area 105 and a known non-occupancy value for an accurate non-occupancy condition in the area 105. In one implementation, the known occupancy value and the known non-occupancy value are pre-determined prior to heuristically determining one of an occupancy or non-occupancy detection in the area 105.

In one implementation, the control module 216 obtains the indicator data of the RF signal generated for multiple times (ta-tn) from each of the R1 and R2. The control module 216 applies one of a heuristic algorithm coefficient (coefficient) among a set of heuristic algorithm coefficients to each of the indicator data from each of the R1 and R2 to generate an indicator data metric value for each of the indicator data from each of the R1 and R2 for the times ta-tn. Each coefficient among the set of coefficients may be randomly selected at an initial stage of training. In one implementation, a coefficient is a variable. In one implementation, a value of the coefficient applied to an indicator data from R1 is the same as the value of the coefficient applied to another indicator data that is from R2. In another implementation, a value of a first coefficient applied to an indicator data from the R1 is different from value of another (second) coefficient applied to another indicator data from R2. In one implementation, the control module 216 processes the indicator data metric values to compute an output value at each of the times ta-tn. In one implementation, the control module 216 determines a relationship of the output value (detected one of an occupancy or non-occupancy condition in the area) with the known value (one of an occupancy value or a non-occupancy value) generated by the trusted detector for each of the ta-tn. Specifically, the control module 216 compares the output value at each of the ta-tn with a threshold of a known value, for example, an output of the trusted detector 230, to detect one of a one of an occupancy condition or a non-occupancy condition in the area as described in greater detail below. In one implementation, the system 202 includes a learning module 220 coupled to the control module 216 to determine whether the set of coefficients are optimized coefficients based on the relationship determined by the control module 216 at the times ta-tn to detect an accurate detection of the occupancy or the non-occupancy condition in the area. In one implementation, upon determination, that the set of coefficients are optimized coefficients, the control module 216 instructs the control module 216 to utilize the optimized coefficients in real time. In one implementation, upon determination, that the set of coefficients are optimized coefficients, the control module 216 instructs the control module 216 to update one or more coefficients among the set of coefficients and utilize the updated one or more coefficients in a next time. The above implementations are described in greater detail below.

In one example, the known value is a known occupancy value at a time t1 among the times ta-tn. In one implementation, the control module 216 determines that the output value falls within the threshold of the known occupancy value. In one implementation, the learning module 220 determines, that the set of coefficients are determined to be optimized coefficients to be applied to the indicator data for the time t1 to determine the accurate detection for occupancy condition. In one implementation, the learning module 220 instructs the control module 216 to utilize the optimized coefficients to apply to each indicator data among the plurality of indicator data from each of the plurality of receivers for the time t1 to detect the occupancy condition in real time. Accordingly, the control module 216 applies the optimized coefficients to determine the occupancy condition in real time. In another implementation, the control module 216 determines that the output value does not fall within the known occupancy value. The learning module 220 determines that the set of coefficients are not optimized coefficients and thus updates the one or more coefficients among the set of the coefficients to generate updated set of coefficients The learning module 220 instructs the control module 216 to utilize the updated set of coefficients in a next time. The control module 216 applies the updated coefficients to corresponding indicator data from each of the R1 and R2 to generate an updated indicator data metric value for each of the indicator data from each of the R1 and R2 at the time t1. In one implementation, the control module 216 processes each of the updated indicator data metric values to compute an updated output value at t1. In one implementation, the control module 216 determines that the updated output value at the time t1 falls within the threshold of the known occupancy value. As such, the learning module 220 determines that the updated set of coefficients are optimized coefficients to be applied to the indicator data for the time t1 to determine the accurate detection for occupancy condition in real time. In another implementation, the control module 216 determines that the updated output value does not fall within the known occupancy value. The control module 216 and the learning module 220 repeats the above process for t1 until the output value falls within the threshold of the known occupancy value to determine that the set of coefficients corresponding to the indicator data from each of the R1 and R2 are the optimized coefficients for the t1 among the ta-tn to accurately detect the occupancy condition at real time. Accordingly, the control module 216 applies the optimized coefficients to determine the occupancy condition in real time.

In another example, the known value is a known non-occupancy value at the time t1. In one implementation, the control module 216 determines that the output value falls within the threshold of the known non-occupancy value. In one implementation, the learning module 220 determines, that the set of coefficients are determined to be optimized coefficients to be applied to the indicator data for the time t1 to determine the accurate detection for non-occupancy condition. In one implementation, the learning module 220 instructs the control module 216 to utilize the optimized coefficients to apply to each indicator data among the plurality of indicator data from each of the plurality of receivers for the time t1 to detect the non-occupancy condition in real time. Accordingly, the control module 216 applies the optimized coefficients to determine the non-occupancy condition in real time. In another implementation, the control module 216 determines that the output value does not fall within the known non-occupancy value. The learning module 220 determines that the set of coefficients are not optimized coefficients and thus updates the one or more coefficients among the set of the coefficients to generate updated set of coefficients The learning module 220 instructs the control module 216 to utilize the updated set of coefficients in a next time. The control module 216 applies the updated coefficients to corresponding indicator data from each of the R1 and R2 to generate an updated indicator data metric value for each of the indicator data from each of the R1 and R2 at the time t1. In one implementation, the control module 216 processes each of the updated indicator data metric values to compute an updated output value at t1. In one implementation, the control module 216 determines that the updated output value at the time t1 falls within the threshold of the known non-occupancy value. As such, the learning module 220 determines that the updated set of coefficients are optimized coefficients to be applied to the indicator data for the time t1 to determine the accurate detection for non-occupancy condition in real time. In another implementation, the control module 216 determines that the updated output value does not fall within the known non-occupancy value. The control module 216 and the learning module 220 repeats the above process for t1 until the output value falls within the threshold of the known non-occupancy value to determine that the set of coefficients corresponding to the indicator data from each of the R1 and R2 are the optimized coefficients for the t1 among the ta-tn to accurately detect the non-occupancy condition at real time. Accordingly, the control module 216 applies the optimized coefficients to determine the occupancy condition in real time.

In one implementation, the output value is computed for each of the indicator data at each of the ta-tn and compared with the one of a known occupancy value or the known non-occupancy value to determine the optimized coefficients for each of the ta-tn to detect an accurate occupancy or non-occupancy condition in the area 105 of FIG. 1A at each of the ta-tn. In one implementation, the optimized set of coefficients for each of the ta-tn are utilized by the control module 216 to detect one of an accurate occupancy and non-occupancy condition in the area 105 of FIG. 1A at real time.

Referring to FIG. 1B, an example of a wireless topology 103 of a lighting system includes a single wireless communication receiver (Rx) and a number of wireless communication transmitters (Txs) in physical space/area 105. In one implementation, an indoor environment is described, but it should be readily apparent that the systems and methods described herein are operable in external environments as well. Specifically, in this example, the area 105 is a room. In one implementation, although, not shown, the area 105 may also include corridors, additional rooms, hallways etc. As illustrated in the example in FIG. 1B, the area 105 includes three intelligent system nodes, out of which two are Tx 132, and Tx 133, and one is the Rx 136. As discussed above, each such system node has an intelligence capability to transmit a signal or receive a signal and process data. In one example, at least one system node includes a light source and is configured as a lighting device. In another example, a system node includes a user interface component and is configured as a lighting controller. In another example a system node includes a switchable power connector and is configured as a plug load controller. In a further example, a system node includes sensor detector and is configured as a lighting related sensor. In one implementation, one of the occupancy condition and the non-occupancy condition in the area 105 is detected according to a heuristic occupancy sensing procedure as will be described below with respect to FIG. 2B.

In the wireless topology 101, the T1 and T2 in the area 105 transmits a RF spectrum (RF) signal for some number (plurality >1) of times. The transmission may be specifically for the occupancy detection. The R1 receives the transmissions of the RF signals through the area 105 for each of the plurality of times from T1 and 12. Accordingly, the R1 is configured to detect a metric of the received RF, which the system (e.g. at one or more of the nodes) uses to detect one of an occupancy condition and a non-occupancy condition based on the RF signals received from the T1 and the T2 in the area 105.

Referring to FIG. 2B, there is shown a functional block diagram of an example of a heuristic occupancy sensing system 201 configured to function on a radio frequency (RF) wireless communication network in accordance with an implementation of a local control of a light source in a lighting system. As illustrated, the heuristic occupancy sensing system 201 includes a lighting system (system) 203 disposed within the physical space/area 105 such as a room, corridor, etc. as described above with respect to FIG. 1B. In one implementation, an indoor environment is described, but it should be readily apparent that the systems and methods described herein are operable in external environments as well.

In one implementation, the system 203 includes the three intelligent system nodes, as described with respect to FIG. 1B above. As discussed above, each such system node has an intelligence capability to transmit and receive data and process the data. Each system node, for example, may include a receiver (R) and/or a transmitter (T) along with another component used in lighting operations. In one example, a system node includes a light source and is configured as a lighting device. In another example, a system node includes a user interface component and is configured as a lighting controller. In another example the system node includes a switchable power connector and is configured as a plug load controller. In a further example, a system node includes sensor detector and is configured as a lighting related sensor. The system node 134 includes a R1, and each of the system nodes 132 and 133 includes a T1 or T2 respectively.

As described above, each of the Tx is configured to transmit RF signals and the Rx is configured to receive signals from each of the Tx. Similar to the system 202 in FIG. 2A, in one implementation, the system 203 includes a light source 206, and a system node containing the source 206 or coupled to and operating together with the source 206 is configured as lighting device. The lighting device, for example, may take the form of a lamp, light fixture, or other luminaire that incorporates the light source, where the light source by itself contains no intelligence or communication capability, such as one or more LEDs or the like, or a lamp (e.g. "regular light bulbs") of any suitable type. The light source 206 is configured to illuminate some or all of the area 105. In one example, each of some number of individual light sources 206 to illuminate portion(s) or a sub-area(s) of the area 105. Typically, a lighting system will include one or more other system nodes, such as a wall switch, a plug load controller, or a sensor.

Similar to the system 202 in FIG. 2A, in one implementation, the lighting system 203 also includes a control module 216. The control module 216 is coupled to the R2 134. In one implementation, the control module is coupled to the light source 206. In an alternate implementation, the control module 216 is coupled to the light source 206 via a network (not shown). In another alternate implementation, the control module 216 is coupled to the lighting system 203 via a network (not shown). In one implementation, the control module 216 is implemented in firmware of a processor configured to determine one of an occupancy condition or a non-occupancy condition in the area 105, although other circuitry or processor-based implementations may be used. In one implementation, the control module 216 is implemented in firmware of the processor in the R1.

Similar to the system 202 in FIG. 2A, in one implementation, the system 203 includes a controller 218 coupled to the control module 216. In one implementation the controller 218 may be the same or an additional processor configured to control operations of elements in the system 203 in response to determination of one of the occupancy condition or the non-occupancy condition in the area 105. For example, in an alternate implementation, when the system 203 includes a light source 206, the controller 218 is configured to process a signal to control operation of the light source 206. In one alternate implementation, the controller 218 is configured to turn ON the light source 206 upon an occupancy condition detected by the control module 216. In one implementation, the controller 218 is configured to turn OFF the light source 206 upon a non-occupancy condition detected by the control module 216. In another implementation, upon the detection of the occupancy or non-occupancy condition in the area 105, the controller 218 is configured to provide other control and management functions in the area such as heating, ventilation and air conditioning (HVAC), heat mapping, smoke control, equipment control, security control, etc. In another implementation, the controller 218 communicates the occupancy condition or non-occupancy condition to the lighting network via a data packet. The data packet is received by one or more luminaires in the lighting network, which are configured to turn ON or OFF the light source(s) 206 and/or in the luminaire or another network node to provide automation of other energy control, equipment control, operational control and management systems (e.g. HVAC, heat mapping, smoke control, equipment control, security control) in the area 105 based on the occupancy or the non-occupancy condition respectively provided in the data packet. Accordingly, the occupancy sensing system 201 communicates the occupancy/non-occupancy condition with other networks. In another alternate implementation, the controller 218 is coupled to the lighting system 203 via a network (not shown). Accordingly, the heuristic occupancy sensing system 201 is configured to function on the RF wireless communication network in accordance with an implementation of a global control of a light source as well as other automation control of energy, equipment, operational and management, as discussed above, of the area in a lighting system.

Although, FIG. 2B illustrates the implementation of a single Rx and a single Tx in each of the nodes, the system 203 may include other implementations such as multiple Rx in one or more nodes and multiple Tx in one or more nodes. Further, the system 203 may include one or more Tx and one or more Rx in each of the nodes. In the illustrated implementation, the system 203 includes a single lighting device with one source 206, however, the system 203 may include multiple lighting devices 206a-206n (see e.g. FIG. 7) including one or more Tx and one or more Rx.

For discussion of an initial example of a heuristic RF-based occupancy sensing operation, assume that the system 203 includes just the elements shown in FIG. 1B. In one example, each of the system nodes 132, 133 and 134 includes the capabilities to communicate over two different RF bands, although the concepts discussed herein are applicable to devices that communicate with luminaires and other system elements via a single RF band. Hence, in the dual band example, the Tx/Rx may be configured for sending and receiving various types of data signals over one band, e.g. for the RF detection leading to occupancy detection. The other band may be used or for pairing and commissioning messages over another band and/or for communications related to detection of RF or higher level occupancy sensing functions, e.g. between receiver R and the controller 220 or the control module 216. For example, the Tx and Rx are configured as a 900 MHz transmitter and receiver for communication of a variety of system or user data, including lighting control data, for example, commands to turn lights on/off, dim up/down, set scene (e.g., a predetermined light setting), and sensor trip events. Alternatively, the Tx and Rx may be configured as a 2.4 GHz transmitter and receiver for Bluetooth low energy (BLE) communication of various messages related to commissioning and maintenance of a wireless lighting system.

In one implementation, benefits of the system include the ability to take advantage of Tx and the Rx (e.g. RF Tx and RF Rx) already installed in a location in the area 105, and because the system passively monitors signal broadcasts in the area 105 at a plurality of times, the heuristic occupancy detection functionality does not require (does not rely on) the occupants to carry any device.

At a high level, each of the T1 and T2 transmits a RF signal at a plurality of times. The transmission may be specifically for the occupancy detection. In some cases, however, where the transmitter is in another lighting device or other lighting system element (e.g. a sensor or a wall switch), the transmissions maybe regular lighting related communications, such as reporting status, sending commands, reporting sensed events, etc. The R1 receives the transmissions of the RF signals from the T1 and the T2 through the area 105 during each of the plurality of times. The R1 generates an indicator data of one or more characteristics of the received RF signal at the plurality of times. As discussed above, some of examples of the characteristics include but are not limited to received signal strength indicator (RSSI) data, bit error rate, packet error rate, phase change etc. or a combination of two or more thereof. For the purpose of the present description, we use RSSI data as the characteristics of the RF signal for processing by the R1 to generate as the indicator data. The R1 measures the signal strength of the received RF signals transmitted by T1 and T2 and generates the RSSI data based on the signal strength of the RF signals transmitted by T1 and T2. The signal strength of each of the RF signal is based whether an occupant exists in a path between each of the T1 and R1 and/or T2 and R1 in the area 105.

For each time, the R1 supplied the generated indicator data of one or more characteristics of the received RF signal transmitted by the T1 and T2 to the control module. In one implementation using RSSI as the characteristic of interest, the control module 216 obtains the generated RSSI data at each of the plurality of times from the R1 and utilizes a heuristic algorithm to determine one of an occupancy condition or a non-occupancy condition in the area 105 as described in greater detail herein below.

As discussed above, in one implementation that takes advantage of the machine learning (ML) capability of the heurist algorithm, the system 203 also includes a trusted detector 230, which provides a known value (similar to the "known answer" as discussed above). Input from the trusted detector 230 trusted detector 230 to "learn" so as to improve performance. The trusted detector 230 in the example may be a standard occupancy sensor, such as passive infrared occupancy detector, a camera based occupancy sensing system, BLE signal sensor (i.e. detecting presence of a phone), manual operation of lighting control (i.e. someone walking into a dark room turning on lights), microphone signal, voice command (a la Alexa), and any other signal or sensor data that can establish the presence of a person in the room. Specifically, the trusted detector 230 provides a known occupancy value for an accurate occupancy condition in the area 105 and a known non-occupancy value for an accurate non-occupancy condition in the area 105. In one implementation, the known occupancy value and the known non-occupancy value are pre-determined prior to heuristically determining one of an occupancy or non-occupancy detection in the area 105.

In one implementation, the control module 216 obtains the indicator data of the RF signals (transmitted by T1 and T2) generated for multiple times (ta-tn) from the R1. The control module 216 applies one of a heuristic algorithm coefficient (coefficient) among a set of heuristic algorithm coefficients to each of the indicator data from the R1 to generate an indicator data metric value for each of the indicator data from R1 for the times ta-tn. Each coefficient among the set of coefficients may be randomly selected at an initial stage of training. In one implementation, coefficient is a variable. In one implementation, the control module 216 processes the indicator data metric values to compute an output value at each of the times ta-tn. In one implementation, the control module 216 determines a relationship of the output value (detected one of an occupancy or non-occupancy condition in the area) with the known value (one of an occupancy value or a non-occupancy value) generated by the trusted detector for each of the ta-tn. Specifically, the control module 216 compares the output value at each of the ta-tn with a threshold of a known value, for example, an output of the trusted detector 230, to detect one of a one of an occupancy condition or a non-occupancy condition in the area as described in greater detail below. In one implementation, the system 203 includes a learning module 220 coupled to the control module 216 to determine whether the set of coefficients are optimized coefficients based on the relationship determined by the control module 216 at the times ta-tn to detect an accurate detection of the occupancy or the non-occupancy condition in the area. In one implementation, upon determination, that the set of coefficients are optimized coefficients, the control module 216 instructs the control module 216 to utilize the optimized coefficients in real time. In one implementation, upon determination, that the set of coefficients are optimized coefficients, the control module 216 instructs the control module 216 to update one or more coefficients among the set of coefficients and utilize the updated one or more coefficients in a next time. The above implementations are described in greater detail below.

In one example, the known value is a known occupancy value at a time t1 among the times ta-tn. In one implementation, the control module 216 determines that the output value falls within the threshold of the known occupancy value. In one implementation, the learning module 220 determines, that the set of coefficients are determined to be optimized coefficients to be applied to the indicator data for the time t1 to determine the accurate detection for occupancy condition. In one implementation, the learning module 220 instructs the control module 216 to utilize the optimized coefficients to apply to each indicator data among the plurality of indicator data from each of the plurality of receivers for the time t1 to detect the occupancy condition in real time. Accordingly, the control module 216 applies the optimized coefficients to determine the occupancy condition in real time. In another implementation, the control module 216 determines that the output value does not fall within the known occupancy value. The learning module 220 determines that the set of coefficients are not optimized coefficients and thus updates the one or more coefficients among the set of the coefficients to generate updated set of coefficients The learning module 220 instructs the control module 216 to utilize the updated set of coefficients in a next time. The control module 216 applies the updated coefficients to corresponding indicator data from the R1 to generate an updated indicator data metric value for each of the indicator data from the R1 at the time t1. In one implementation, the control module 216 processes each of the updated indicator data metric values to compute an updated output value at t1. In one implementation, the control module 216 determines that the updated output value at the time t1 falls within the threshold of the known occupancy value. As such, the learning module 220 determines that the updated set of coefficients are optimized coefficients to be applied to the indicator data for the time t1 to determine the accurate detection for occupancy condition in real time. In another implementation, the control module 216 determines that the updated output value does not fall within the known occupancy value. The control module 216 and the learning module 220 repeats the above process for t1 until the output value falls within the threshold of the known occupancy value to determine that the set of coefficients corresponding to the indicator data from the R1 are the optimized coefficients for the t1 among the ta-tn to accurately detect the occupancy condition at real time. Accordingly, the control module 216 applies the optimized coefficients to determine the occupancy condition in real time.

In another example, the known value is a known non-occupancy value at the time t1. In one implementation, the control module 216 determines that the output value falls within the threshold of the known non-occupancy value. In one implementation, the learning module 220 determines, that the set of coefficients are determined to be optimized coefficients to be applied to the indicator data for the time t1 to determine the accurate detection for non-occupancy condition. In one implementation, the learning module 220 instructs the control module 216 to utilize the optimized coefficients to apply to each indicator data from R1 for the time t1 to detect the non-occupancy condition in real time. Accordingly, the control module 216 applies the optimized coefficients to determine the non-occupancy condition in real time. In another implementation, the control module 216 determines that the output value does not fall within the known non-occupancy value. The learning module 220 determines that the set of coefficients are not optimized coefficients and thus updates the one or more coefficients among the set of the coefficients to generate updated set of coefficients The learning module 220 instructs the control module 216 to utilize the updated set of coefficients in a next time. The control module 216 applies the updated coefficients to corresponding indicator data from the R1 to generate an updated indicator data metric value for each of the indicator data from the R1 at the time t1. In one implementation, the control module 216 processes each of the updated indicator data metric values to compute an updated output value at t1. In one implementation, the control module 216 determines that the updated output value at the time t1 falls within the threshold of the known non-occupancy value. As such, the learning module 220 determines that the updated set of coefficients are optimized coefficients to be applied to the indicator data for the time t1 to determine the accurate detection for non-occupancy condition in real time. In another implementation, the control module 216 determines that the updated output value does not fall within the known non-occupancy value. The control module 216 and the learning module 220 repeats the above process for t1 until the output value falls within the threshold of the known non-occupancy value to determine that the set of coefficients corresponding to the indicator data from R1 are the optimized coefficients for the t1 among the ta-tn to accurately detect the non-occupancy condition at real time. Accordingly, the control module 216 applies the optimized coefficients to determine the occupancy condition in real time.

In one implementation, the output value is computed for each of the indicator data at each of the ta-tn and compared with the one of a known occupancy value or the known non-occupancy value to determine the optimized coefficients for each of the ta-tn to detect an accurate occupancy or non-occupancy condition in the area 105 of FIG. 1B at each of the ta-tn. In one implementation, the optimized set of coefficients for each of the ta-tn are utilized by the control module 216 to detect one of an accurate occupancy and non-occupancy condition in the area 105 of FIG. 1B at real time.

Referring to FIG. 3, an example of a wireless topology 301 of a lighting system includes a number of wireless communication transmitters (Tx) and a number of wireless communication receiver (Rx) in physical space/area 305. In one implementation, indoor environment is described, but it should be readily apparent that the systems and methods described herein are operable in external environments as well. Specifically, in this example, the area 305 includes a combination of a room 360, and a hallway 380. In one implementation, although, not shown, the area 305 may also include corridors, additional rooms, additional hallways etc. In one implementation, although, not shown, the area 305 may also include corridors, additional rooms, hallways etc.

A wall 390 separates the room 360 from the hallway 380 with an opening 392. As illustrated in the example in FIG. 1, the area 305 includes six intelligent system nodes 332, 334, 336, 338, 340, and 342. Each such system node has an intelligence capability to transmit a signal or receive a signal and process data. In one example, at least one system node includes a light source and is configured as a lighting device.

In another example, a system node includes a user interface component and is configured as a lighting controller. In another example a system node includes a switchable power connector and is configured as a plug load controller. In a further example a system node includes sensor detector and is configured as a lighting related sensor.

In general, a heuristic algorithm with prior or ongoing training for machine learning, "learns" how to manipulate various inputs, possibly including previously generated outputs, in order to generate current new outputs. As part of this learning process, the algorithm receives feedback on prior outputs and possibly some other inputs. Then, the machine learning algorithm calculates parameters to be associated with the various inputs (e.g. the previous outputs, feedback, etc.). The parameters are then utilized by the machine learning to manipulate the inputs and generate the current outputs intended to improve some aspect of system performance in a desired manner. During the machine learning phase, the training data is the discrepancy between the outputs of a present system and the outputs of a trusted system.

In a lighting system with occupancy detection, for example, the training data may be the discrepancy between the outputs of an RF based detection system operating in a user/consumer installation and a trusted occupancy detection system such as a standard occupancy sensor (e.g. such as a sensor using passive infrared (PIR), a camera based system, BLE signal sensor (i.e. detecting presence of a phone), manual operation of lighting control (i.e. someone walking into a dark room turning on lights), microphone signal, voice command (a la Alexa), and any other signal or sensor data that can establish the presence of a person in the room). Machine learning techniques such as logical regression and artificial neural networks are applied to reduce the discrepancy, or example, by optimizing one or more coefficients used in the real time occupancy/non-occupancy decision. Training can take place ahead of the time (before product shipment/commissioning) or in the field as an on-going optimization to reduce false positives in detecting an occupant.

An example may apply a "supervised learning" approach in which the system will be provided a "known answer" from a "trusted detector" and machine learning is used to optimize the occupancy/non-occupancy detect algorithm to minimize the difference between the system output and the "known answer." A trusted detector may be a passive infrared occupancy detector, a camera, BLE signal sensor (i.e. detecting presence of a phone), manual operation of lighting control (i.e. someone walking into a dark room turning on lights), microphone signal, voice command (a la Alexa), and any other signal or sensor data that can establish the presence of a person in the room. The particular machine learning approach can be one of decision tree or artificial neural net.

Learning can take place prior to shipping product or as part of commissioning after installation. In either such case, the system may normally operate in the field without using the trusted detector in real time.

Alternatively, a trusted detector can be installed with the system in the field and utilized in real time, in which case, there may be on-going machine learning. For an ongoing learning implementation, the data can be routed to a cloud, learning can take place on another system, and then the improved algorithm (e.g. in the form of new node parameters in the case of a neural network) can be downloaded to the installed lighting system.

In one implementation, details of the heuristic algorithm and machine learning are provided in more detail with respect to the example of FIG. 3.

System nodes 332, 334, 136 and 138 are located in the room 360 and the system nodes 340 and 342 are located in the hallway 380. Each of the system nodes 332, 334 and 336 include transmitters T1, T2 and T3 respectively and each of the system nodes 338, 340 and 342 include receivers R1, R2 and R3 respectively. In one implementation, one of the occupancy condition and the non-occupancy condition in the entire area 305 and or a sub-area (for example, room 360) in the area 305 is detected according to a ML occupancy sensing procedure as will be described below with respect to FIG. 4.

In the wireless topology 301 each of the transmitters T1-T3 in the area 305 transmits a RF spectrum (RF) signal for some number (plurality >1) of times. The transmissions from T1-T3 may be specifically for the occupancy detection or for other lighting system communications. Each of the receivers R1-R3 in the area 305 receives the transmissions of the RF signal through the area 305 for each of the plurality of times from each of the multiple T1-T3. Logically, such a three transmitter-three receiver arrangement provides nine T-R pairings for the analysis (each of the three transmitters T1-T3 each paired logically with each of the three receivers R1-R3). Accordingly, each of the R1-R3 is configured to detect a metric of the received RF, which the system (e.g. at one or more nodes) uses to detect one of an occupancy/non-occupancy analysis condition in its own sub-area (room 360 or the hallway 380) based on receipt of the multiple RF signals received globally from the multiple T1-T3 in the area 305.

In one example, it is desired to determine an occupancy or non-occupancy condition in a sub-area such as room 360 of the area 305. Thus, for example, a RF perturbation caused by a person in room 380 is detected by the T1/R1 and T2/R2 (in the room 360), each of which generates a signal indicator data for the heuristic analysis. A person in the room 360 can also trigger a response in the hallway 390 detected by the T1/R3 and/or T2/R3 in the hallway 380, but at a lower signal level. A signal level threshold may be used to reject the false positive in the hallway 390. A similar threshold approach may be implemented to reject the false positives at the nodes, i.e. T3/R1 and T3/R2 in the room 360 when a person in the hallway 390 causes T3 to transmit RF signals detected by R1 and R2 in the room 360. A similar threshold approach may be implemented to prevent false positives at the nodes i.e. T3/R3 in the hallway 390.

In one example, it is desired to determine an occupancy or non-occupancy condition in the room 180. The heuristic algorithm is configured to processing indicator data from R1 and R2 to detect one of an inaccurate occupancy or inaccurate non-occupancy condition in the room 180 since each of R1 and R2 receives RF signals not only from the T1 and the T2 in the room 180 but also receives RF signals from the T3 in the hallway 180. Accordingly, the heuristic algorithm is applied to allow processing of indicator data from the R1 and R2 in the room 160 to ignore/eliminate the RF signals received from the R3, which are generated by the T3 due to the presence of the occupants in the hallway 180 and/or multipath returns of signals generated by the T1 and T2 in the room 180 but received due to or modified by the presence of occupants in the hallway 180.

Figure 4:
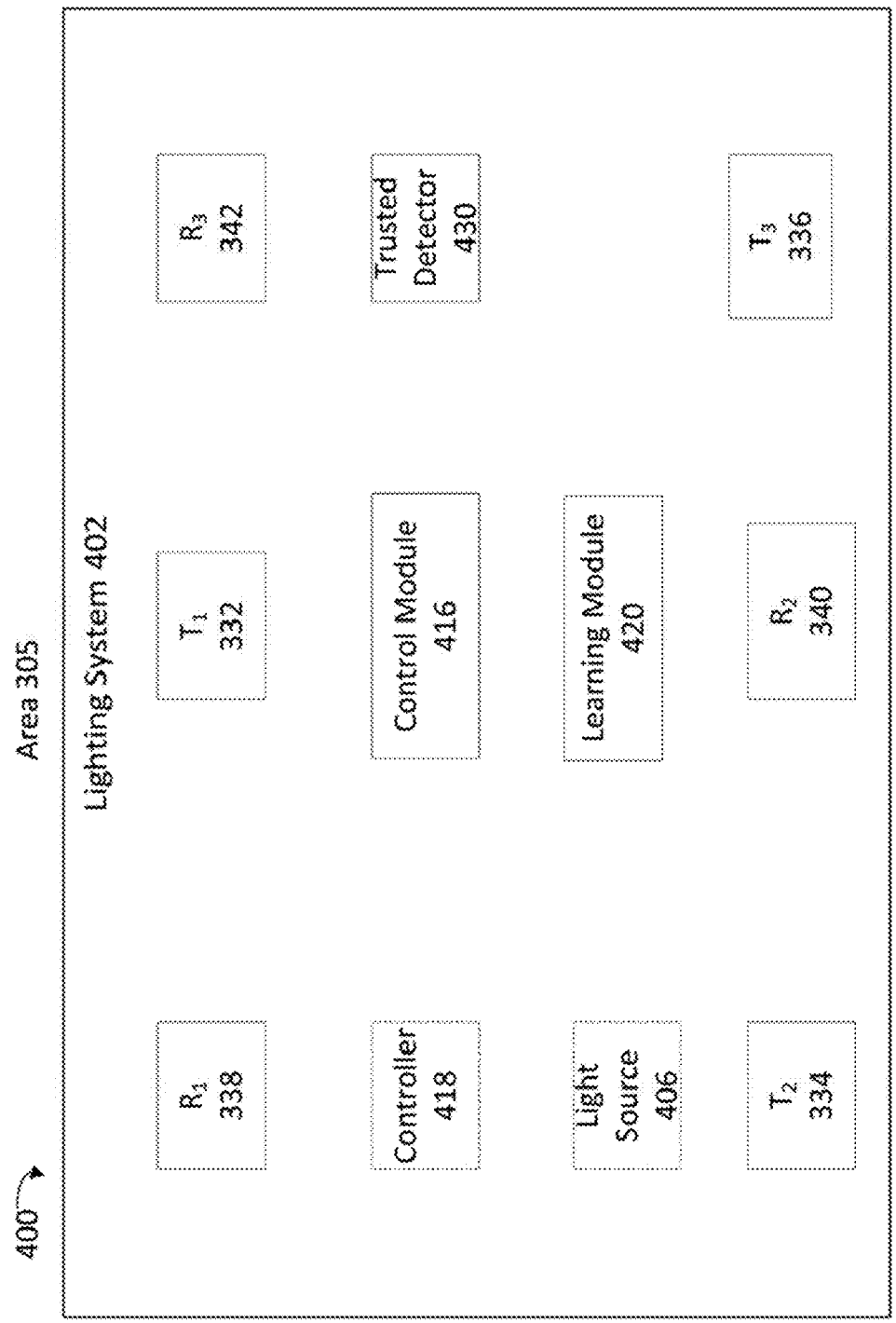
FIG. 4 is a functional block diagram depicting an example of a heuristic occupancy sensing system based on the wireless topology of FIG. 3 in accordance with an implementation of a local control of a light source in a lighting system.

Referring to FIG. 4, there is shown a functional block diagram of another example of a heuristic occupancy sensing system 400 configured to function on a radio frequency (RF) wireless communication network in accordance with an implementation of a local control of a light source in a lighting system. As illustrated, the ML occupancy sensing system 400 includes a lighting system (system) 402 disposed within the physical space/area 305 such as a room and a hallway etc. as described above with respect to FIG. 3. In one implementation, an indoor environment is described, but it should be readily apparent that the systems and methods described herein are operable in external environments as well.

In one implementation, the system 402 includes the six intelligent system nodes 332, 334, 336, 338, 340, and 342 as described with respect to FIG. 3 above. As discussed above, each such system node has an intelligence capability to transmit and receive data and process the data. Each system node, for example, may include a receiver (R) and/or a transmitter (T) along with another component used in lighting operations. In one example, a system node includes a light source and is configured as a lighting device. In another example, a system node includes a user interface component and is configured as a lighting controller. In another example the system node includes a switchable power connector and is configured as a plug load controller. In a further example, a system node includes sensor detector and is configured as a lighting related sensor. In the example of the wireless topology of FIG. 3, the system nodes 332, 334, and 336 include T1, T2 and T3 respectively; and the system nodes 338, 340 and 342 include R1, R2 and R3 respectively.

As described above, the Tx is configured to transmit RF signals and each of the Rx is configured to receive signals from each Tx. In one implementation, the system 402 includes a light source 406, and a system node containing the source 206 or coupled to and operation together with the source 406 and is configured as lighting device. The lighting device, for example, may take the form of a lamp, light fixture, or other luminaire that incorporates the light source, where the light source by itself contains no intelligence or communication capability, such as one or more LEDs or the like, or a lamp (e.g. "regular light bulbs") of any suitable type. The light source 406 is configured to illuminate some or all of the area 405. In one example, each of some number of individual the light sources 406 to illuminate portion(s) or sub-area(s) of the area 405. Typically, a lighting system will include one or more other system nodes, such as a wall switch, a plug load controller, or a sensor.

In one implementation, the lighting system includes a control module 416 coupled to the receivers R1, R2 and R3. In one example, the control module 416 is coupled to each of the R1, R2 and R3 via 530 (not shown). In one implementation, the control module 416 is coupled to the light source 406. In one alternate implementation, the control module 416 is coupled to the light source 406 via a network (not shown). In another alternate implementation, the control module 416 is coupled to the lighting system 402 via a network (not shown). In one implementation, the control module 416 is implemented in firmware of a processor configured to determine one of an occupancy condition or a non-occupancy condition in the area 305 or the sub-area (for example, room 360) in the area 305, although other circuitry or processor based implementations may be used. In one implementation, the control module 216 is implemented in firmware of the processor in or more of the R1, R2 or R3.

In one implementation, the system 402 includes a controller 418 coupled to the control module 416. In one implementation the controller 418 may be the same or an additional processor configured to control operations of elements in the system 402 in response to determination of one of the occupancy condition or the non-occupancy condition in the area 305 or a sub-area (for example, room 360) in the area 305. For example, in an alternate implementation, when the system 402 includes a light source 406, the controller 418 is configured to process a signal to control operation of the light source 406. In one alternate implementation, the controller 418 is configured to turn ON the light source 406 upon an occupancy condition detected by the control module 416. In one alternate implementation, the controller 418 is coupled to the control module 416 via a network (not shown). In one implementation, the controller 418 is configured to turn OFF the light source 406 upon a non-occupancy condition detected by the control module 416. In another implementation, upon the detection of the occupancy or non-occupancy condition in the area 105, the controller 218 is configured to provide other control and management functions in the area such as heating, ventilation and air conditioning (HVAC), heat mapping, smoke control, equipment control, security control, etc. In another implementation, the controller 418 communicates the occupancy condition or non-occupancy condition to the lighting network via a data packet. The data packet is received by one or more luminaires in the lighting network, which are configured to turn ON or OFF the light source(s) 406 and/or in the luminaire or another network node to provide automation of other energy control, equipment control, operational control and management systems (e.g. HVAC, heat mapping, smoke control, equipment control, security control) in the area 105 based on the occupancy or the non-occupancy condition respectively provided in the data packet. Accordingly, the heuristic occupancy sensing system 400 communicates the occupancy/non-occupancy condition with other networks. In another alternate implementation, the controller 418 is coupled to the lighting system 402 via a network (not shown). Accordingly, the heuristic occupancy sensing system 400 is configured to function on the RF wireless communication network in accordance with an implementation of a global control of a light source, as well as other automation control of energy, equipment, operational and management, as discussed above, of the area in a lighting system.

In one implementation, the system nodes typically include a processor, memory and programming (executable instructions in the form of software and/or firmware). Although the processor may be a separate circuity (e.g. a microprocessor), in many cases, it is feasible to utilize the central processing unit (CPU) and associated memory of a micro-control unit (MCU) integrated together with a transceiver in the form of a system on a chip (SOC). Such an SOC can implement the wireless communication functions as well as the intelligence (e.g. including any detector or controller capabilities) of the system node.

In examples discussed in more detail later, system nodes often may include both a transmitter and a receiver (sometimes referenced together as a transceiver), for various purposes. At times, such a transceiver-equipped node may use its transmitter as part of a heuristic occupancy sensing operation; and at other times such a transceiver-equipped node may use its receiver as part of a heuristic occupancy sensing operation. Such nodes also typically include a processor, memory and programming (executable instructions in the form of software and/or firmware). Although the processor may be a separate circuity (e.g. a microprocessor), in many cases, it is feasible to utilize the central processing unit (CPU) and associated memory of a micro-control unit (MCU) integrated together with physical circuitry of a transceiver in the form of a system on a chip (SOC). Such an SOC can implement the wireless communication functions as well as the intelligence (e.g. including any detector or controller capabilities) of the system node.

Although the system nodes 332, 334, 336, 338, 340 and 342 of FIG. 3 illustrates an implementation of a single Tx and a single Rx in each of the nodes, the system 402 may include other implementations such as multiple Txs (see e.g. FIGS. 2A to 2C) in one or more nodes. Also, FIG. 3 illustrates the implementation of a single Rx in each of the nodes, the system 202 may include other implementations such as multiple Rx (see e.g. FIGS. 2B to 2C) in one or more nodes. Further, in the illustrated implementation the system 402 includes a single lighting device with one source 406, however, the system 402 may include multiple lighting devices 406a-406n (see e.g. FIG. 7) including one or more Tx and one or more Rx.

For discussion of an initial example of a heuristic RF-based occupancy sensing operation, assume that the system 402 includes just the elements shown in FIG. 3. In one example, each of the system nodes 332, 334, 336 and 338 includes the capabilities to communicate over two different RF bands, although the concepts discussed herein are applicable to devices that communicate with luminaires and other system elements via a single RF band. Hence, in the dual band example, the Tx/Rx may be configured for sending and receiving various types of data signals over one band, e.g. for the RF detection leading to occupancy detection. The other band may be used or for pairing and commissioning messages over another band and/or for communications related to detection of RF or higher level occupancy sensing functions, e.g. between receivers R1 and R2 and the controller 420 or the control module 416. For example, the Tx and Rx are configured as a 900 MHz transmitter and receiver for communication of a variety of system or user data, including lighting control data, for example, commands to turn lights on/off, dim up/down, set scene (e.g., a predetermined light setting), and sensor trip events. Alternatively, the Tx and Rx may be configured as a 2.4 GHz transmitter and receiver for Bluetooth low energy (BLE) communication of various messages related to commissioning and maintenance of a wireless lighting system.

In one implementation, benefits of the system include the ability to take advantage of Tx and the Rx (e.g. RF Tx and RF Rx) already installed in a location in the area 305, and because the system passively monitors signal broadcasts in the area 305 at a plurality of times, the heuristic occupancy detection functionality does not require (does not rely on) the occupants to carry any device.

At a high level, the T1 transmits a RF spectrum (RF) signal at a plurality of times. The transmission may be specifically for the occupancy detection. In some cases, however, where the transmitter is in another lighting device or other lighting system element (e.g. a sensor or a wall switch), the transmissions maybe regular lighting related communications, such as reporting status, sending commands, reporting sensed events, etc. Each of the R1-R3 receives the transmissions of the RF signal from each of the T1-T3 through the area 305 for each of the plurality of times. Each of the R1-R3 generates an indicator data of one or more characteristics of the received RF signal at the plurality of times. Some examples of the characteristics include but are not limited to received signal strength indicator (RSSI) data, bit error rate, packet error rate, phase change etc. or a combination of two or more thereof. The RSSI data represents measurements of signal strength of the received RF. The bit error rate is rate of incorrect bits in received RF signals versus total number of bits in the transmitted RF signals. The packet error rate is rate of incorrect packets in received RF signals versus total number of packets the transmitted RF signals. Phase change is a change of phase of a received RF signal compared to previous reception of the RF signal (typically measured between the antennas spaced apart from each other). For the purpose of the present description, we use RSSI data as the characteristics of the RF signal for processing by each of the R1-R3 to generate as the indicator data. Each of the R1-R3 measures the signal strength of the received RF signal and generates the RSSI data based on the signal strength. The signal strength of each of the RF signal is based whether an occupant exists in a path between each of the T1-T3 and R1-R3 in the area 305.

For each time, each of the receivers R1-R3 supplied the generated indicator data of one or more characteristics of the received RF signal to the control module, in one implementation using RSSI as the characteristic of interest, the control module 416 obtains the generated RSSI data at each of the plurality of times from the various receivers R1-R3 and utilizes a heuristic algorithm to determine one of an occupancy condition or a non-occupancy condition in the area 305 or the sub-area (for example, room 360) in the area 305 as described in greater detail herein below as a training method to determine one of an occupancy or non-occupancy detection of the area 305 or the sub-area (for example, room 360) in the area 305 as described in greater detail herein below.

The control module 416 applies one of a heuristic algorithm coefficient (coefficient) among a set of heuristic algorithm coefficients to each of the indicator data from each of the R1-R3 to generate an indicator data metric value for each of the indicator data from each of the R1-R3 for the times ta-tn. Each coefficient among the set of coefficients may be randomly selected at an initial stage of training. In one implementation, a set of coefficients are utilized to detect occupancy and non-occupancy condition in the entire area 305. In one implementation, a different set of coefficients are utilized to detect the occupancy condition and the non-occupancy condition in the region (example, room 360) in the area 305. As such, the different set of coefficients are selected to reject false positives such as transmission signals from T3 and received signals from R3 that are not part of the room 360. In one implementation, the heuristic algorithm is trained using the appropriate set of coefficients to detect the occupancy and non-occupancy condition in the entire area 305 or the region of the area, for example, the room 360. As discussed above, training can take place ahead of the time (before product shipment/commissioning) or in the field as an on-going optimization to reduce false positives in detecting an occupant. Also as discussed above, the training is executed by the trusted detector. Accordingly, the occupancy and non-occupancy detection as discussed below with respect to the area may include the entire area 305 or a region (example room 360) of the entire area 305.

In one implementation, a coefficient is a variable. In one implementation, a value of a coefficient applied to an indicator data from one of the R1-R3 is the same as a value of a coefficient applied to another indicator data that is from another one of the R1-R3. In another implementation, a value of a first coefficient applied to an indicator data from one of the R1-R3 is different from value of another (second) coefficient applied to another indicator data from another one of the R1-R3. In one implementation, the control module 416 processes the indicator data metric values to compute an output value at each of the times ta-tn. In one implementation, the control module 416 determines a relationship of the output value (detected one of an occupancy or non-occupancy condition in the area) with the known value (one of an occupancy value or a non-occupancy value) generated by the trusted detector for each of the times ta-tn. Specifically, the control module 416 compares the output value at each of the ta-tn with a threshold of a known value, for example, an output of the trusted detector 420, to detect one of a one of an occupancy condition or a non-occupancy condition in the area as described in greater detail below. In one implementation, the system 402 includes a learning module 420 coupled to the control module 416 to determine whether the set of coefficients are optimized coefficients based on the relationship determined by the control module 416 at times ta-tn to detect an accurate detection of the occupancy or the non-occupancy condition in the area. In one implementation, upon determination, that the set of coefficients are optimized coefficients, the control module 416 instructs the control module 416 to utilize the optimized coefficients in real time. In one implementation, upon determination, that the set of coefficients are optimized coefficients, the control module 416 instructs the control module 416 to update one or more coefficients among the set of coefficients and utilize the updated one or more coefficients in a next time. The above implementations are described in greater detail below.

In one example, the known value is a known occupancy value at the time t1 among the times ta-tn. In one implementation, the control module 416 determines that the output value falls within the threshold of the known occupancy value. In one implementation, the learning module 420 determines, that the set of coefficients are determined to be optimized coefficients to be applied to the indicator data for the time t1 to determine the accurate detection for occupancy condition. In one implementation, the learning module 420 instructs the control module 416 to utilize the optimized coefficients to apply to each indicator data among the plurality of indicator data from each of the plurality of receivers for the time t1 to detect the occupancy condition in real time. Accordingly, the control module 416 applies the optimized coefficients to determine the occupancy condition in real time. In another implementation, the control module 416 determines that the output value does not fall within the known occupancy value. The learning module 420 determines that the set of coefficients are not optimized coefficients and thus updates the one or more coefficients among the set of the coefficients to generate updated set of coefficients. The learning module 420 instructs the control module 416 to utilize the updated set of coefficients in a next time. The control module 416 applies the updated coefficients to corresponding indicator data from each of the R1-R3 to generate an updated indicator data metric value for each of the indicator data from each of the R-R3 at the time t1. In one implementation, the control module 416 processes each of the updated indicator data metric values to compute an updated output value at t1. In one implementation, the control module 416 determines that the updated output value at the time t1 falls within the threshold of the known occupancy value. As such, the learning module 420 determines that the updated set of coefficients are optimized coefficients to be applied to the indicator data for the time t1 to determine the accurate detection for occupancy condition in real time. In another implementation, the learning module 416 determines that the updated output value does not fall within the known occupancy value. The control module 416 and the learning module 420 repeats the above process for t1 until the output value falls within the threshold of the known occupancy value to determine that the set of coefficients corresponding to the indicator data from each of the R1-R3 are the optimized coefficients for the t1 among the ta-tn to accurately detect the occupancy condition at real time. Accordingly, the control module 416 applies the optimized coefficients to determine the occupancy condition in real time.

In another example, the known value is a known non-occupancy value at the time t1. In one implementation, the control module 416 determines that the output value falls within the threshold of the known non-occupancy value. In one implementation, the learning module 420 determines, that the set of coefficients are determined to be optimized coefficients to be applied to the indicator data for the time t1 to determine the accurate detection for non-occupancy condition. In one implementation, the learning module 420 instructs the control module 416 to utilize the optimized coefficients to apply to each indicator data among the plurality of indicator data from each of the plurality of receivers for the time t1 to detect the non-occupancy condition in real time. Accordingly, the control module 416 applies the optimized coefficients to determine the non-occupancy condition in real time. In another implementation, the control module 416 determines that the output value does not fall within the known non-occupancy value. The learning module 420 determines that the set of coefficients are not optimized coefficients and thus updates the one or more coefficients among the set of the coefficients to generate updated set of coefficients. The learning module 420 instructs the control module 416 to utilize the updated set of coefficients. The control module 416 applies the updated coefficients to corresponding indicator data from each of the R1 and R2 to generate an updated indicator data metric value for each of the indicator data from each of the R1 and R2 at the time t1. In one implementation, the control module 416 processes each of the updated indicator data metric values to compute an updated output value at t1. In one implementation, the control module 416 determines that the updated output value at the time t1 falls within the threshold of the known non-occupancy value. As such, the learning module 420 determines that the updated set of coefficients are optimized coefficients to be applied to the indicator data for the time t1 to determine the accurate detection for non-occupancy condition in real time. In another implementation, the control module 416 determines that the updated output value does not fall within the known non-occupancy value. The control module 416 and the learning module 420 repeats the above process for t1 until the output value falls within the threshold of the known non-occupancy value to determine that the set of coefficients corresponding to the indicator data from each of the R1-R3 are the optimized coefficients for the t1 among the ta-tn to accurately detect the non-occupancy condition at real time. Accordingly, the control module 416 applies the optimized coefficients to determine the occupancy condition in real time.

In one implementation, the output value is computed for each of the indicator data at each of the ta-tn and compared with the one of a known occupancy value or the known non-occupancy value to determine the optimized coefficients for each of the ta-tn to detect an accurate occupancy or non-occupancy condition in the area 305 or the region (for example, room 360) in the area 305 of FIG. 3 at each of the ta-tn. In one implementation, the optimized set of coefficients for each of the ta-tn are utilized by the control module 416 to detect one of an accurate occupancy and non-occupancy condition in the area 305 or the region (for example, room 360) in the area 305 of FIG. 3 at real time.

In one implementation, the control module 416 includes a logistic regression technique as a training method to determine one of an occupancy or non-occupancy detection of the area 305 or the sub-area (for example, room 360) in the area 305 of FIG. 3. A logistic regression is a statistical method for analyzing a dataset in which there are one or more independent variables that determine an outcome. The goal of logistic regression is to find the best fitting model to describe the relationship between the dichotomous characteristic of interest (outcome variable) and a set of independent variables. Logistic regression generates coefficients (and its standard errors and significance levels) of a formula to predict a logit ransformation of the probability of presence of the characteristic of interest. In one implementation, the set of independent variables is the indicator data, for example, RSSI data (R11, R12, R13, R21, R22, R23, R31, R32 and R33). In one implementation, heuristic algorithm coefficients (coefficients) are a set of coefficients x1-x9, the outcome is a binary output value of the formula and the characteristic of interest is one of occupant or non-occupant in the area. Specifically, R1 is the RSSI data generated by the R1 based on the RF signal received from T1, R12, is the RSSI data generated by the R1 based on the RF signal received from T2, R13 is the RSSI data generated by the R1 based on the RF signal received from T3, R21 is the RSSI data generated by the R2 based on the RF signal received from T1, R22 is the RSSI data generated by the R2 based on the RF signal received from T2, R23 is the RSSI data generated by the R3 based on the RF signal received from T3, R31 is the RSSI data generated by the R2 based on the RF signal received from T1, R32, is the RSSI data generated by the R3 based on the RF signal received from T2, and R33 is the RSSI data generated by the R3 based on the RF signal received from T3.

In this example, the training includes applying a coefficient among a set of the coefficients x1-x9 to each of the RSSI data (R11, R12, R13, R21, R22, R23, R31, R32 and R33) generated at multiple times. In one implementation, during an initial stage of the training, each of the coefficients among the set of coefficient x1-x9 are randomly selected. In one implementation, value of a coefficient in a set of coefficients x1-x9 is different from the value of another coefficient in the set of coefficients. In one implementation, value of a coefficient in a set of coefficients x1-x9 is same as another coefficient in a set of coefficients. In one implementation, one or more of the coefficients among the set of coefficients x0-x9 are updated based on an output value as described in greater detail below.

In one implementation, the RSSI data is analyzed by applying one of the coefficients among the set of coefficients to each of the RSSI data at multiple times. Specifically, each of the R11, R12, R13, R21, R22, R23, R31, R32 and R33 is multiplied by its corresponding coefficient x1-x9 resulting in multiple product values (x1R11, x2R12, x3, R13, x4R21, x5R22, x6R23, x7R3, x8R32 and x9R33). In one implementation, an output value of the logistic regression is generated for the set of coefficients by adding up all the product values and an independent coefficient x0 to compute a single added value, compute an exponent value of this single added value, adding a value of 1 to the exponent value to compute an added exponent value and dividing a value of 1 with this added exponent value to determine the output value as shown herein below:

$$\frac{1}{1+\exp[-(x_0+x_1R_{11}+x_2R_{12}+x_3R_{13}+x_4R_{21}+x_5R_{22}+x_6R_{23}+x_7R_{31}+x_8R_{32}+x_9R_{33})]}$$

In one implementation, the output value is computed for each of the RSSI data at multiple times (ta-tn). In one implementation, each output value computed at each time among the multiple times (ta-tn) is compared with a threshold of a true occupancy value and a true non-occupancy value. A true occupancy value or a non-occupancy value is a "known answer" computed from a trusted detector (e.g. a passive infrared occupancy detector, a camera, BLE signal sensor (i.e. detecting presence of a phone), manual operation of lighting control (i.e. someone walking into a dark room turning on lights), microphone signal, voice command (a la Alexa), and any other signal or sensor data that can establish the presence of a person in the room) for each of the times among the multiple times (ta-tn). A threshold for true occupancy value is an occupancy threshold and a threshold for true non-occupancy value is a non-occupancy threshold. For example, the true occupancy value is 1 for a time t1 among the times ta-tn and the occupancy threshold is any value that is equal to 0.5 or is between 0.5 and 1 or equal to 1. Thus, any output value that falls within the occupancy threshold for the time t1 is considered to be an accurate detection of the occupancy condition in the area 305 or the sub-area (for example, room 360) in the area 305 of FIG. 3. In another example, the true non-occupancy value is 0 for a time period t8 among the times ta-tn and a threshold value is any value that is equal to 0 or is in between 0 and 0.5. Thus, any output value that falls within the non-occupancy threshold for the time t8 is considered to be an accurate detection of the non-occupancy condition in the area 305 or the sub-area (for example, room 360) in the area 305 of FIG. 3.

In one implementation, when the output value falls within the occupancy threshold at the time t1, the x0 and the coefficients in the x1-x9 are considered to be optimized coefficients and these optimized coefficients are utilized in the logistic regression as described above to detect an occupancy condition in the area 305 or the sub-area (for example, room 360) in the area 305 at a real time. In one implementation, when the output value does not fall within the occupancy threshold at the time t1, one or more coefficients in the x1-x9 and/or the x0 are updated using a first gradient function as shown herein below:

$$Xn = Xn - \eta \frac{\partial C}{\partial Xn}$$

Xn is the coefficient, n is the learning rate, C is the cost (loss) function. C is the difference between the computed output value and the true occupancy or non-occupancy value. C is minimized by taking the gradient with respect to the coefficients. In one implementation, the updating of one or more of the x1-x9 and/or the x0, computing of the output data values are repeated until the output data value falls within the occupancy threshold occupancy at the time t1. In one implementation, upon determination of the output value falling within the occupancy threshold at the time t1, the corresponding updated x0 and the updated one or more of x1-x9 are determined to be the optimized coefficients and are utilized in the logistic regression as described above to detect an occupancy condition in the area 305 or the sub-area (for example, room 360) in the area 305 at a real time.

In one implementation, when the output value falls within the non-occupancy threshold at the time t8, the x0 and the coefficients in the x1-x9 are considered to be optimized coefficients and these optimized coefficients are utilized in the logistic regression as described above to detect a non-occupancy condition in the area 305 or the sub-area (for example, room 360) in the area 305 at a real time. In one implementation, when the output value does not fall within the non-occupancy threshold at the time t8, one or more coefficients in the x1-x9 and/or the x0 are updated using the first gradient function as described above. In one implementation, the updating of the one or more of the x1-x9 and/or x0, and computing of the output data values are repeated until the output data value falls within the non-occupancy threshold occupancy at the time t8. In one implementation, upon determination of the output value falling within the non-occupancy threshold at the time t8, the corresponding updated x0 and the updated one or more of x1-x9 are determined to be the optimized coefficients and are utilized in the logistic regression as described above to detect a non-occupancy condition in the area 305 or the sub-area (for example, room 360) in the area 305 at a real time.

Figure 5:
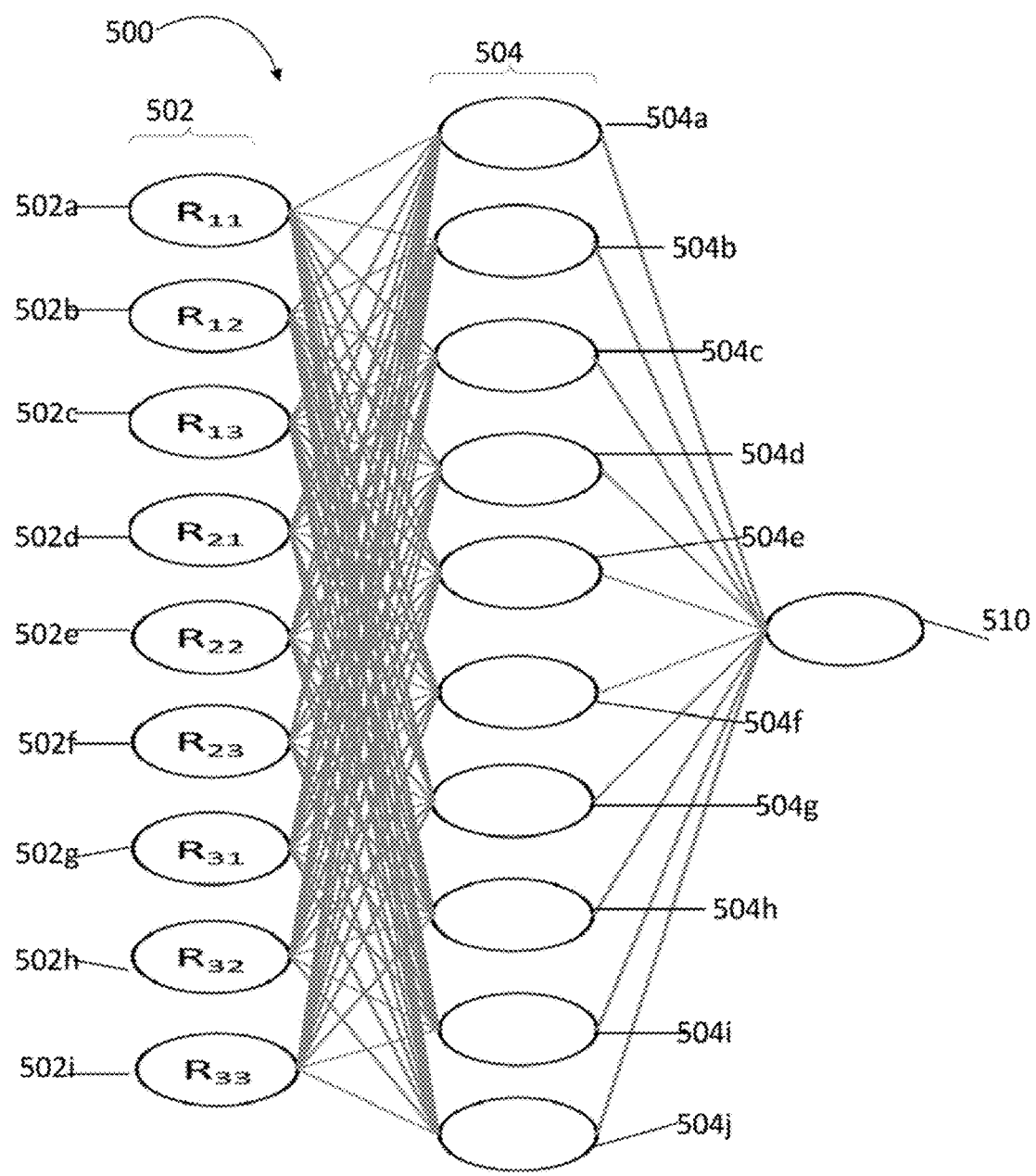
FIG. 5 illustrates an example of a neural network for heuristically determining an occupancy or non-occupancy condition in a lighting system.

In one implementation, the control module 416 includes a neural network as a training method to determine one of an occupancy or non-occupancy detection of the area 305 or the sub-area (for example, room 360) in the area 305 of FIG. 3. Referring to FIG. 5, there is shown an example of a neural network 500. The neural network 500 includes an input layer 502 of input nodes 502a-502i, at least one middle layer 504 of middle nodes 504a-504j and an output node 510. Although, the middle layer 504 includes ten nodes, it is known to one of ordinary skill that the middle layer 504 may include any number of nodes, the number likely to be larger than the number of input nodes. Even though only one middle layer is shown, it known to one of ordinary skill in the art that more than one middle layer of nodes may be implemented in the neural network 500. As shown, each of the input nodes 504a-504i is coupled to each of the middle nodes 504a-504j and each of the middle nodes 504a-504j is coupled to the output node 510. In one implementation, each of the middle nodes 504a-504j in the middle layer 504 includes a corresponding bias constant ba-bi unique to that node. The bias constants ba-bi are initially randomly assigned. In one implementation, each connection from each of the input nodes 502a-502i to each of the middle nodes 504a-504j includes a corresponding weight (Wa-Wi) unique to the connection. The weights Wa-Wi are initially randomly assigned. In one implementation, the bias constants ba-bi and the weights Wa-Wi are the plurality of coefficients as described above.

The input layer of nodes 502a-502i includes the RSSI data R11, R12, R13, R21, R22, R23, R31, R32 and R33. Specifically, input node 502a includes R11, input node 502b includes R12, input node 502c includes R13, input node 502d includes R21, input node 502e includes R22, input node 502f includes R23, input node 502g includes R31, input node 502h includes R32, and input node 502i includes R33. As such, number of input nodes in the input layer of nodes 502a-502i is equal to number of RSSI data R11, R12, R13, R21, R22, R23, R31, R32 and R33. In one implementation, a forward propagation including propagation function and an activation function is executed in the neural network as described herein below.

An output of each of the input nodes 502a-502i is an input to each of the middle nodes 504a-504i in the middle layer. In one implementation, the forward propagation includes a propagation function executed at each of the middle nodes, 504a-504i to generate propagation function values. Specifically, the propagation function is determined by multiplying each of the RSSI data, R11, R12, R13, R21, R22, R23, R31, R32 and R33 with its corresponding weight (W) among the Wa-Wi and added with its corresponding bias constant (b) among the ba-bi of each of the middle nodes 504a-504i resulting in a propagation value Za-Zi at each of the middle nodes 504a-504i, which is summed together into a single propagation value Zj as shown below:

$$z_j^l = \sum_k w_{jk}^l R_k^{l-1} + b_j^l$$

The single propagation value Zj is fed into the activation function executed in the output node 510 resulting in an output value, aj as shown herein below:

$$a_j^l = f(z_j^l)$$

In one implementation, the output value is computed for each of the RSSI data at multiple times (ta-tn). In one implementation, each output value computed at each time among the multiple times (ta-tn) is compared with a threshold of a true occupancy value and a true non-occupancy value. A true occupancy value or a non-occupancy value is a "known answer" computed from a trusted detector (e.g. passive infrared occupancy detector, a camera, BLE signal sensor (i.e. detecting presence of a phone), manual operation of lighting control (i.e. someone walking into a dark room turning on lights), microphone signal, voice command (a la Alexa), and any other signal or sensor data that can establish the presence of a person in the room) for each of the times among the multiple times (ta-tn). A threshold for true occupancy value is an occupancy threshold and a threshold for true non-occupancy value is a non-occupancy threshold. For example, the true occupancy value is 1 for time t11 among the times ta-tn and an occupancy threshold for the true occupancy value is 0.8 (i.e. 80%). Thus any output value at the time t1 is equal to or greater than the occupancy threshold is considered to be an accurate detection of the occupancy condition in the area 305 or the sub-area (for example, room 360) in the area 305 of FIG. 3. In another example, the true non-occupancy value is 0 for time t8 among the times ta-tn and a non-occupancy threshold of the true non-occupancy value is 0.2 (i.e. 20%). Thus, any output value at the time t8 is at equal to or greater than the non-occupancy threshold is considered to be an accurate detection of the non-occupancy condition in the area 305 or the sub-area (for example, room 360) in the area 305 of FIG. 3.

In one implementation, the output value at the time t1 is determined to be 0.9, which is compared with the true occupancy threshold of 0.8. Since the output value at the time t1 is greater than the threshold value of 0.8, then the corresponding weights Wa-Wi and the bias constants ba-bi are considered to be optimized coefficients and these optimized coefficients are utilized in the forward propagation as described above to detect an occupancy condition in the area 305 or the sub-area (for example, room 360) in the area 305 at real time. In another implementation, the output value at the time t1 is determined to be 0.6, which is less than the occupancy threshold of 0.8, accordingly, one or more weights Wa-Wi may be updated using a second gradient descent function as shown below:

$$w'_{jk} = w_{jk} - \eta \frac{\partial C}{\partial w_{jk}}$$

Further, one or more bias constants ba-bi may be updated using the third gradient descent function as shown herein below:

$$b'_j = b_j - \eta \frac{\partial C}{\partial b_j}$$

W is the weight, b is the bias constant, n is the learning rate, C is the cost (loss) function. C is the difference between the computed output value and the true occupancy or non-occupancy value. C is minimized by taking the gradient with respect to the coefficients. In one implementation, a backward propagation function is applied to the neural network 500 using the one or more updated values of the weights, Wa-Wi and/or the one or more updated bias constants ba-bi. In one implementation, the backward propagation function includes providing the one or more updated values of the weights Wa-Wi and/or one or more updated bias constants ba-bi at the output node 510 and then cascading backwards towards the input node 502 by applying the one or more updated weights Wa-Wi and/or the one or more updated values of the bias constants ba-bi cascade backwards at each of the corresponding middle nodes 504a-504j in the middle layer 504 (including any additional middle nodes in additional middle layers not shown).

In one implementation, an updated output value is generated for the t1 with the one or more updated weights Wa-Wi and/or the one or more updated bias constants ba-bi using the forward propagation as described above. In one implementation, the updating of Wa-Ai using the second gradient function and/or of the ba-bi using the third gradient function as described above, backward propagation and the forward propagation are repeated until the output data value falls within the occupancy threshold occupancy at the time t1. In one implementation, upon determination of the output value falling within the occupancy threshold at the time t1, the corresponding updated Wa-Wi and/or the updated ba-bi are utilized in the forward propagation as described above to detect an occupancy condition in the area 305 or the sub-area (for example, room 360) in the area 305 at a real time.

Referring back to the example, above, in one implementation, when the output value at the time 18 is determined to be 0.2, which is compared with the true non-occupancy threshold of 0.2. Since, the output value of 0.2 is equal to or less than the true occupancy threshold of 0.2, the corresponding Wa-Wi and the bias constants ba-bi are considered to be optimized coefficients and these optimized coefficients are utilized in the forward propagation as described above to detect a non-occupancy condition in the area 305 or the sub-area (for example, room 360) in the area 305 at real time. In another implementation, when the output value at the time t8, is determined to be 0.4, which is less than the true non-occupancy threshold of 0.2, than one or more weights Wa-Wi and/or one or more bias constants ba-bi are updated using the above second and third gradient functions respectively as discussed above. In one implementation, the updating of the Wa-Wi and/or the ba-bi, the backward propagation and the forward propagation re repeated until the output data value falls within the non-occupancy threshold at the time, t8. In one implementation, upon determination of the output value falling within the non-occupancy threshold at the time t8, the corresponding one or more updated Wa-Wi and/or one or more updated ba-bi are utilized in the forward propagation as described above to detect a non-occupancy condition in the area 305 or the sub-area (for example, room 360) in the area 305 at a real time.

Figure 6:
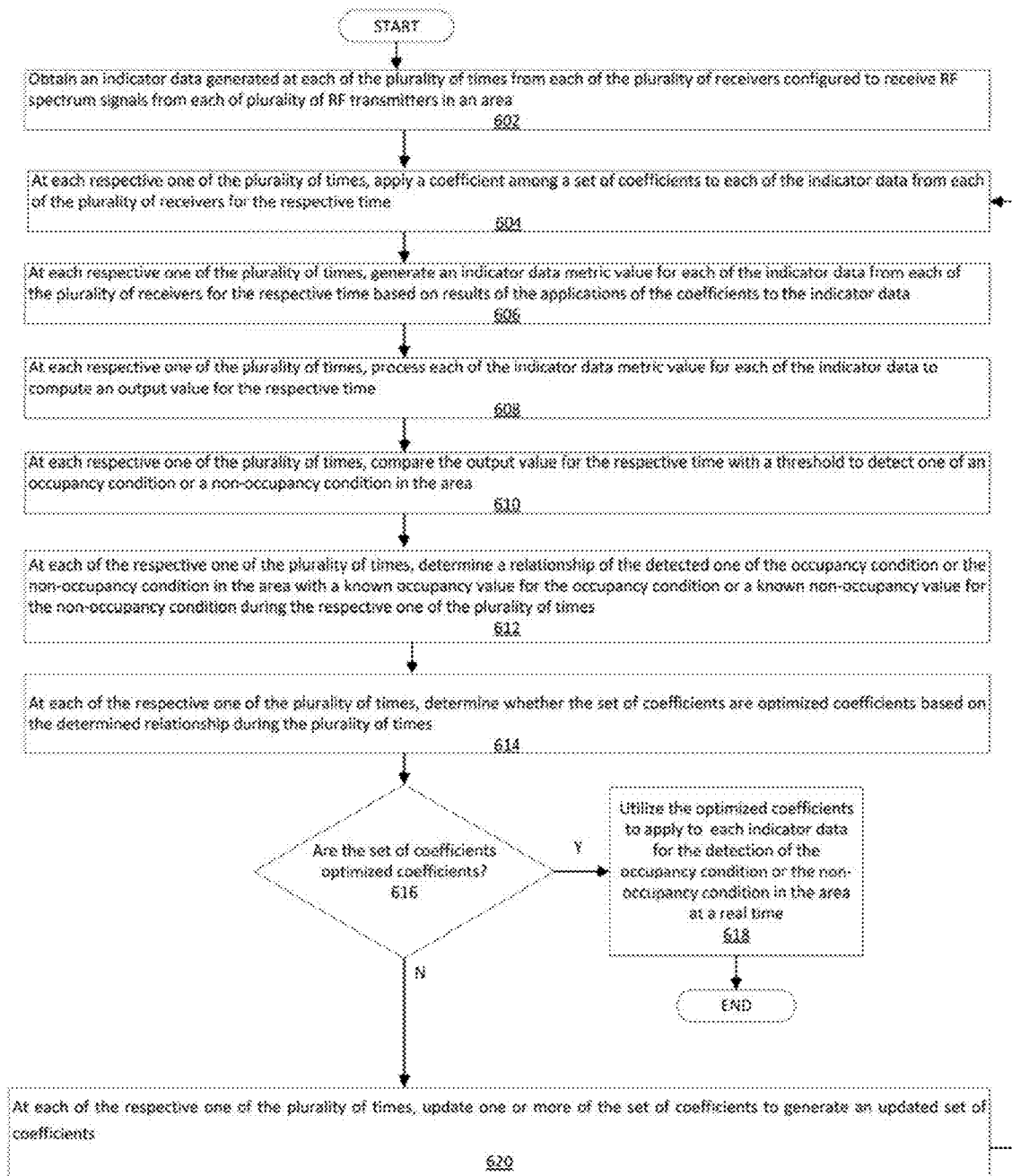
FIG. 6 is a high-level flow chart illustration of an example of a method for heuristically determining an occupancy or non-occupancy condition.

FIG. 6 illustrates an example of a flowchart of a method 600 for heuristic detection of an occupancy and non-occupancy condition for multiple times in area 105 of a lighting system either of FIGS. 2A, 2B or the area 305 or the sub-area (for example, room 360) in the area 305 of the lighting system of FIG. 4. As discussed above, the lighting system (system) is disposed within a physical space/area such as a room, corridor, hallway, or doorway. In one implementation, indoor environment is described, but it is known to one of ordinary skill that the systems and methods described herein are operable in external environments as well. In one implementation, the method 600 is implemented by the control module 216 and the learning module 220 of FIG. 2A or FIG. 2B. In one implementation, the method 600 is implemented by the control module 416 and the learning module 420 of FIG. 4.

At block 602, an indicator data generated at each of the plurality of times from a receiver configured to receive RF spectrum (RF) signals from a plurality of RF transmitters in an area is obtained. As discussed above, some of the characteristics include but are not limited to received signal strength indicator (RSSI) data, bit error rate, packet error rate, phase change etc. or a combination of two or more thereof. At block 604, at each respective one of the plurality of times, a coefficient among a set of coefficients is applied to each of the indicator data from each of the plurality of receivers for the respective time. In one implementation, during the initial stage of the training, each of the coefficients among the set of coefficients are randomly selected. At block 606, at each respective one of the plurality of times, generate an indicator data metric value for each of the indicator data from each of the plurality of receivers for the respective time based on results of the applications of the coefficients to the indicator data. At block 608, at each respective one of the plurality of times, each of the indicator data metric value for each of the indicator data is processed to compute an output value for the respective time. At block 610, at each respective one of the plurality of times, the output value is compared with a threshold to detect one of an occupancy condition or a non-occupancy condition in the area. In one implementation, a threshold is a threshold of the known occupancy value for the occupancy condition. In another implementation, a threshold of the known non-occupancy value for the non-occupancy condition. At block 612, at each of the respective one of the plurality of times, a relationship is determined of the detected one of the occupancy condition or the non-occupancy condition in the area with a known occupancy value for the occupancy condition or a known non-occupancy value for the non-occupancy condition during the respective one of the plurality of times. At block 614, at each of the respective one of the plurality of times, it is determined whether the set of coefficients are optimized coefficients based on the determined relationship during the plurality of times. At block 616, at each of the respective one of the plurality of times, decision is made whether the set of coefficients are the optimized coefficients. When at block 616, it is determined that the set of coefficients are optimized coefficients, then at step 618, the optimized coefficients are utilized to apply to each indicator data for the detection of the occupancy condition or the non-occupancy condition in the area at a real time. When at block 616, it is determined that the set of coefficients are not optimized coefficients, then at step 620, at each of the respective one of the plurality of times, one or more of the set of coefficients are updated to generate an updated set of coefficients. In one implementation, the method is repeated from block 604 for the updated set of coefficients until it is determined that the updated set of coefficients are optimized coefficients to detect an accurate occupancy or non-occupancy condition at each respective one of the plurality of times.

Figure 7:
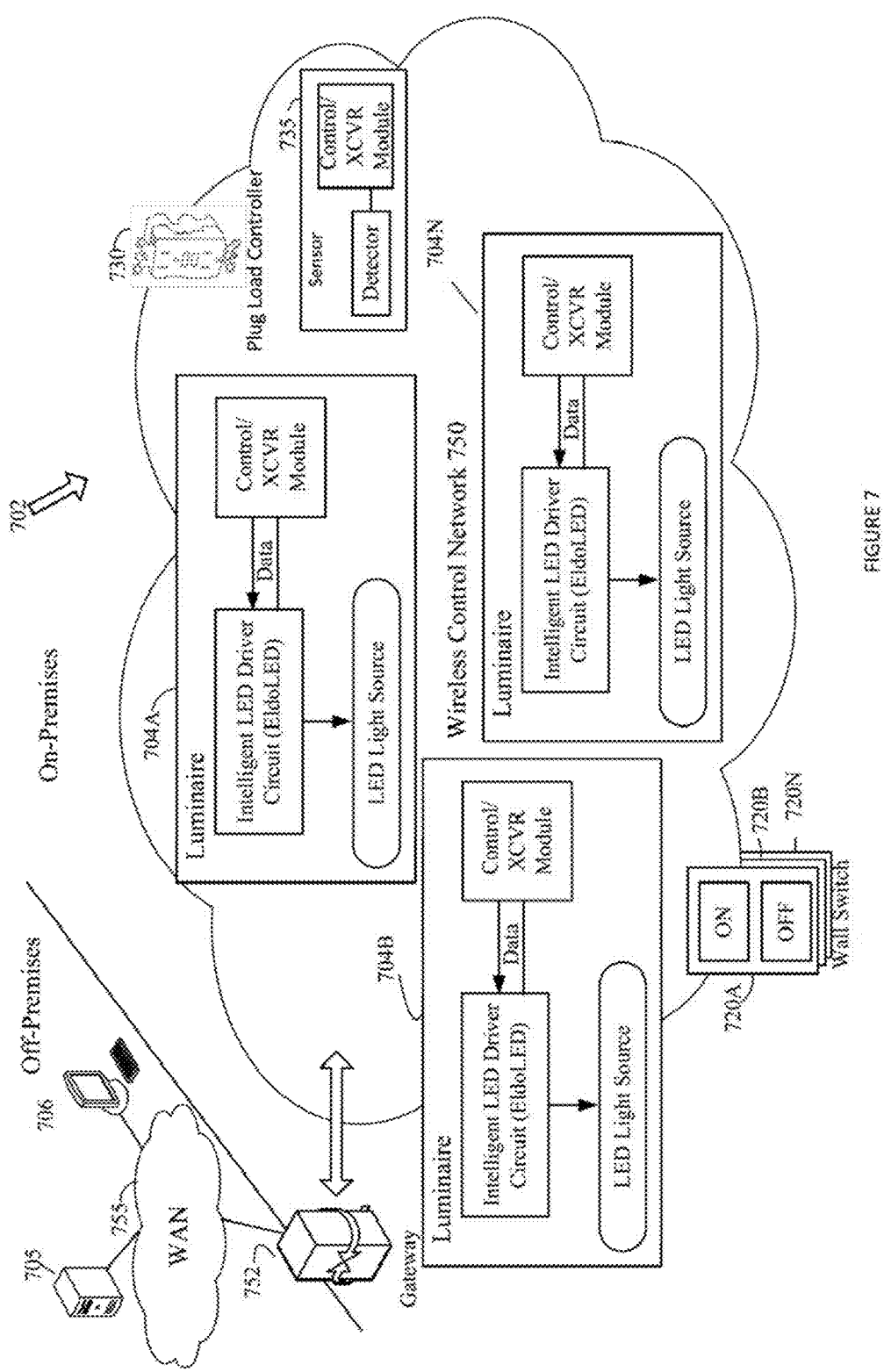
FIG. 7 is a functional block diagram illustrating an example relating to a lighting system of networked devices that provide a variety of lighting capabilities and may implement RF-based occupancy sensing.

FIG. 7 is a functional block diagram illustrating an example relating to a system of a wireless networked devices that provide a variety of lighting capabilities and may implement RF-based occupancy sensing. The wireless networked devices also provide ng communications in support of lighting functions such as turning lights on/off, dimming, set scene, or sensor trip events and may implement RF-based occupancy sensing. It should be understood that the term "lighting control device" means a device that includes a controller (Control/XCVR module or microcontrol unit) that executes a lighting application for communication over a wireless lighting network communication band, of control and systems operations information during control network operation over the lighting network communication band.

A lighting system 702 may be designed for indoor commercial spaces, although the system may be used in outdoor or residential settings. As shown, system 702 includes a variety of lighting control devices, such as a set of lighting devices (a.k.a. luminaires) 104a-104n (lighting fixtures), a set of wall switch type user interface component (a.k.a. wall switches) 720a-720n, a plug load controller type element (a.k.a. plug load controller) 730 and a sensor type element (a.k.a. sensor) 735. Daylight, ambient light, or audio sensors may embedded in lighting devices, in this case luminaires 704a-704n. RF wireless occupancy sensing as described above is implemented in one or more of the luminaires 704a-704n to enable occupancy/non-occupancy based control of the light sources. One or more luminaires may exist in a wireless network 750, for example, a sub-GHz or Bluetooth (e.g. 2.4 GHz) network defined by an RF channel and a luminaire identifier.

The wireless network 750 may use any available standard technology, such as WiFi, Bluetooth, ZigBee, etc. An example of a lighting system using a wireless network, such as Bluetooth low energy (BLE), is disclosed in patent application publication US20160248506 A1 entitled "System and Method for Communication with a Mobile Device Via a Positioning System Including RF Communication Devices and Modulated Beacon Light Sources," the entire contents of which are incorporated herein by reference. Alternatively, the wireless network may use a proprietary protocol and/or operate in an available unregulated frequency band, such as the protocol implemented in nLight® Air products, which transport lighting control messages on the 900 MHz band (an example of which is disclosed in U.S. patent application Ser. No. 15/214,962, filed Jul. 20, 2016, entitled "Protocol for Lighting Control Via a Wireless Network," the entire contents of which are incorporated herein by reference). The system may support a number of different lighting control protocols, for example, for installations in which consumer selected luminaires of different types are configured for a number different lighting control protocols.

The system 702 also includes a gateway 752, which engages in communication between the lighting system 702 and a server 705 through a network such as wide area network (WAN) 755. Although FIG. 7 depicts server 705 as located off premises and accessible via the WAN 755, any one of the luminaires 704a-704n, for example are configured to communicate one of a occupancy detection or a non-occupancy detection in an area to devices such as the server 705 or even a laptop 706 located off premises.

The lighting control 702 can be deployed in standalone or integrated environments. System 702 can be an integrated deployment, or a deployment of standalone groups with no gateway 752. One or more groups of lighting system 702 may operate independently of one another with no backhaul connections to other networks.

Lighting system 702 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting system 704 includes a communications backbone and includes model—transport, network, media access control (MAC)/physical layer (PHY) functions.

Lighting control 702 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 750 for backhaul connection, time sync control, data collection and management capabilities, and interoperation with the Acuity Brands Lighting's commercially available SensorView product may also be provided.

Figure 8:
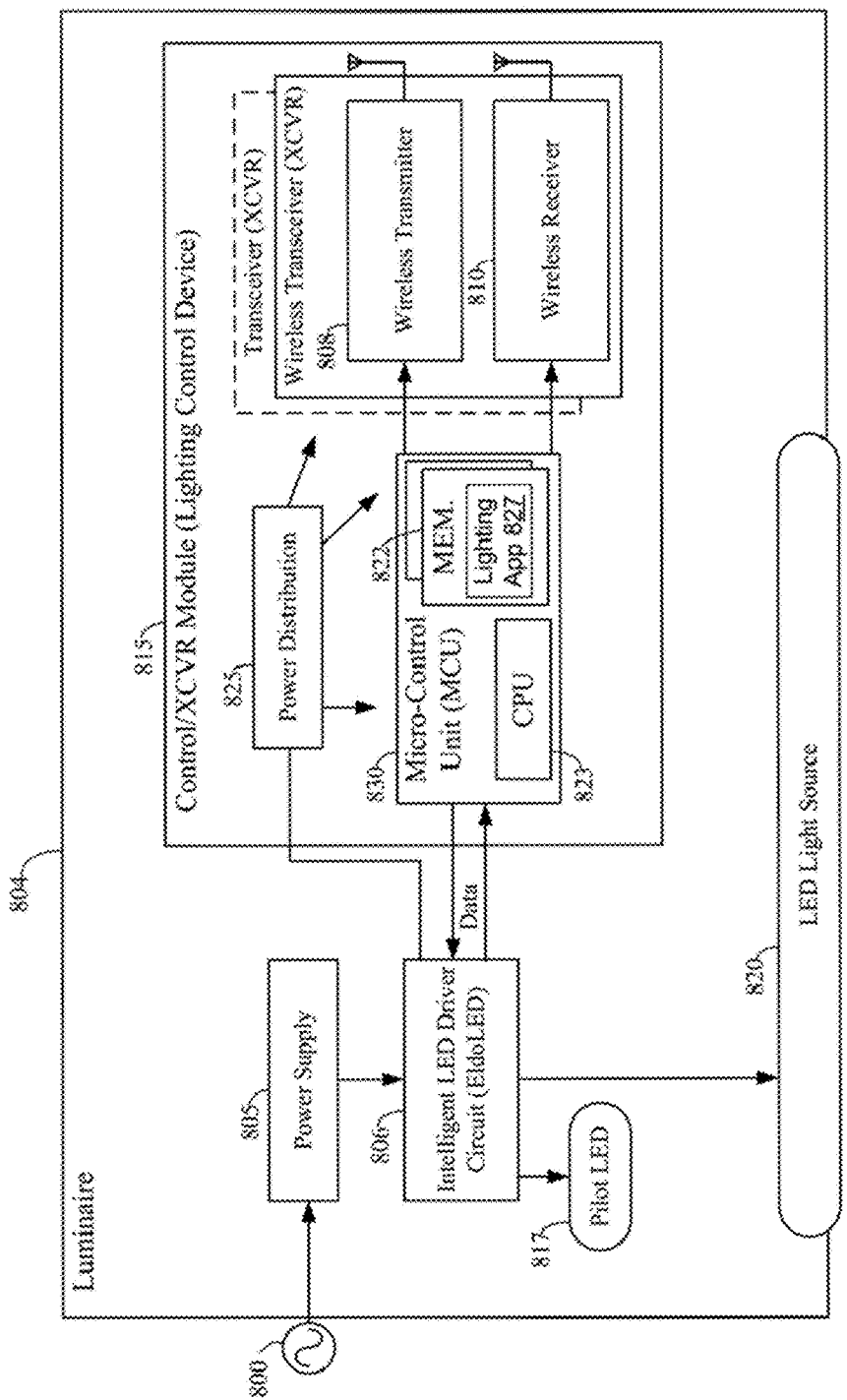
FIG. 8 is a block diagram of an example of a lighting device that operates in and communicates via the lighting system of FIG. 7.

FIG. 8 is a block diagram of a lighting device (in this example, a luminaire) 804 that operates in and communicates via the lighting system 702 of FIG. 7. Luminaire 804 is an integrated light fixture that generally includes a power supply 805 driven by a power source 800. Power supply 805 receives power from the power source 800, such as an AC mains, battery, solar panel, or any other AC or DC source. Power supply 805 may include a magnetic transformer, electronic transformer, switching converter, rectifier, or any other similar type of circuit to convert an input power signal into a power signal suitable for luminaire 804.

Luminaire 804 furthers include an intelligent LEI) driver circuit 810, control/XCVR module 815, and a light emitting diode (LED) light source 820. Intelligent LED driver circuit 810 is coupled to LED light source 820 and drives that LEI) light source 820 by regulating the power to LED light source 820 by providing a constant quantity or power to LED light source 320 as its electrical properties change with temperature, for example. The intelligent LED driver circuit 810 includes a driver circuit that provides power to LED light source 820 and a pilot LED 817. The pilot LED 817 may be included as part of the control/XCVR module 315. Intelligent LED driver circuit 810 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 810 is manufactured by EldoLED.

LED driver circuit 810 can further include an AC or DC current source or voltage source, a regulator, an amplifier (such as a linear amplifier or switching amplifier), a buck, boost, or buck/boost converter, or any other similar type of circuit or component. LED driver circuit 810 outputs a variable voltage or current to the LEI) light source 820 that may include a DC offset, such that its average value is nonzero, and/or an AC voltage.

Control/XCR module 815 includes power distribution circuitry 825 and a micro-control unit (MCU) 830. As shown, MCU 830 is coupled to LED driver circuit 810 and controls the light source operation of the LED light source 820. MCU 830 includes a memory 322 (volatile and non-volatile) and a central processing unit (CPU) 823. The memory 822 includes a lighting application 827 (which can be firmware) for both occupancy detection and lighting control operations. The power distribution circuitry 825 distributes power and ground voltages to the MCU 830, wireless transmitter 808 and wireless receiver 810, to provide reliable operation of the various circuitry on the sensor/control module 815 chip.

Luminaire 804 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, luminaire 804 has a radio set that includes radio transmitter 808 as well as a radio receiver 810, together forming a radio transceiver. The wireless transmitter 808 transmits RF signals on the lighting network. This wireless transmitter 808 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the luminaire 804 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The RF spectrum or "radio spectrum" is a non-visible part of the electromagnetic spectrum, for example, from around 3 MHz up to approximately 3 THz, which may be used for a variety of communication applications, radar applications, or the like. In the discussions above, the RF transmitted and received for network communication, e.g. Wifi, BLE, Zigbee etc., was also used for occupancy detection functions, in the frequencies bands/bandwidths specified for those standard wireless RF spectrum data communication technologies. In another implementation, the transceiver is an ultra-wide band (also known as UWB, ultra-wide band and ultraband) transceiver. UWB is a radio technology that can use a very low energy level for short-range, high-bandwidth communications over a large portion of the radio spectrum. UWB does not interfere with conventional narrowband and carrier wave transmission in the same frequency band. Ultra-wideband is a technology for transmitting information spread over a large bandwidth (>500 MHz) and under certain circumstances be able to share spectrum with other users.

Ultra-wideband characteristics are well-suited to short-distance applications, such as short-range indoor applications. High-data-rate UWB may enable wireless monitors, the efficient transfer of data from digital camcorders, wireless printing of digital pictures from a camera without the need for a personal computer and file transfers between cell-phone handsets and handheld devices such as portable media players. UWB may be used in a radar configuration (emitter and deflection detection at one node) for real-time location systems and occupancy sensing/counting systems; its precision capabilities and low power make it well-suited for radio-frequency-sensitive environments. Another feature of UWB is its short broadcast time. Ultra-wideband is also used in "see-through-the-wall" precision radar-imaging technology, precision detecting and counting occupants (between two radios), precision locating and tracking (using distance measurements between radios), and precision time-of-arrival-based localization approaches. It is efficient, with a spatial capacity of approximately 1013 bit/s/m=. In one example, the UWB is used as the active sensor component in an automatic target recognition application, designed to detect humans or objects in any environment.

The MCU 830 may be a system on a chip. Alternatively, a system on a chip may include the transmitter 808 and receiver 810 as well as the circuitry of the MCU 830.

As shown, the MCU 830 includes programming in the memory 822. A portion of the programming configures the CPU (processor) 823 to detect one of an occupancy or non-occupancy condition in an area in the lighting network, including the communications over one or more wireless communication. The programming in the memory 822 includes a real-time operating system (RTOS) and further includes a lighting application 827 which is firmware/software that engages in communications with controlling of the light source based on one of the occupancy or non-occupancy condition detected by the CPU 823. The lighting application 827 programming in the memory 822 carries out lighting control operations over the lighting network 750 of FIG. 7. The programming for the detection of an occupancy or non-occupancy condition in the area may be implemented as part of the RTOS, as part of the lighting application 827, as a standalone application program, or as other instructions in the memory.

Figure 9:
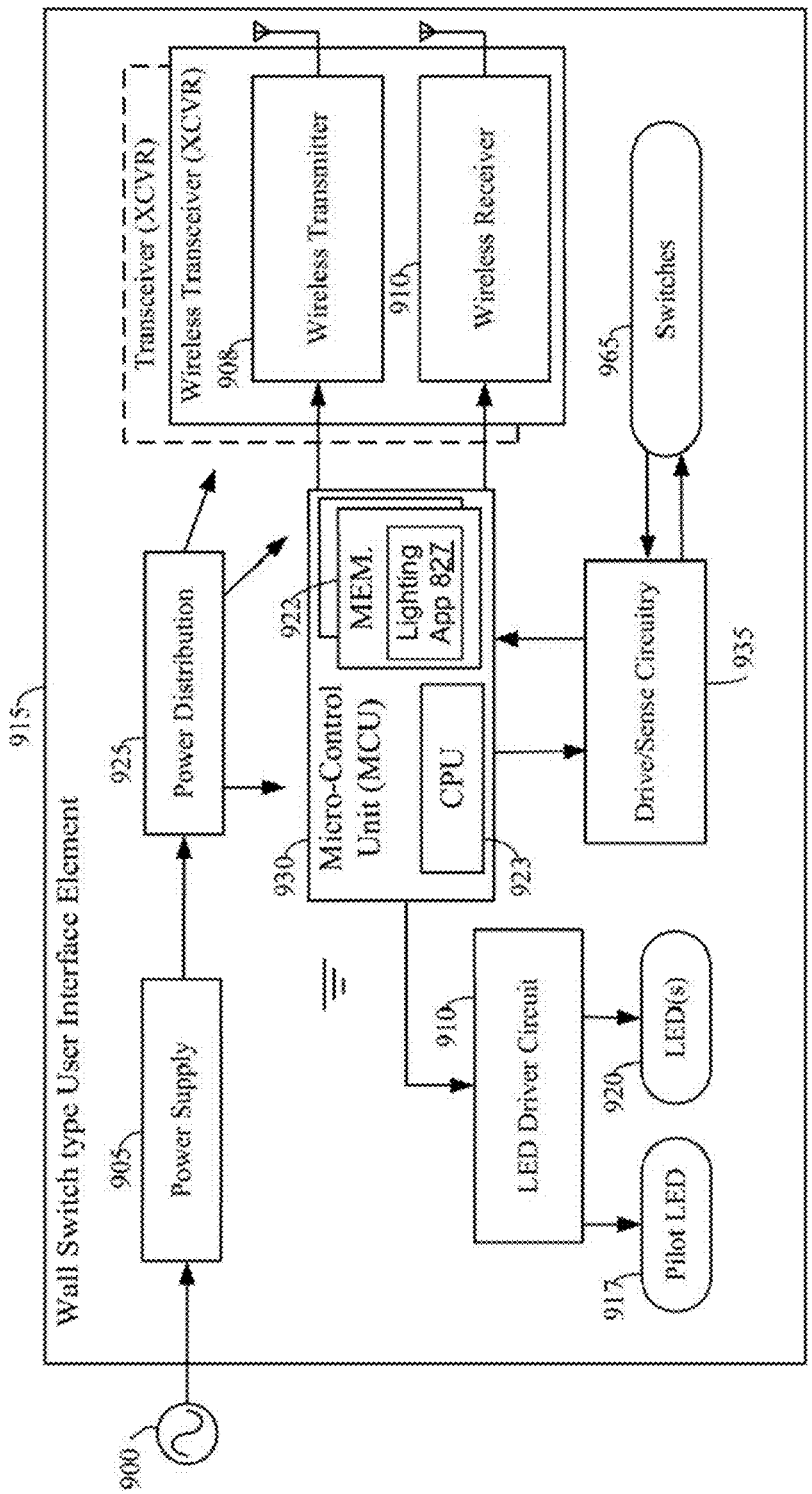
FIG. 9 is a block diagram of an example of a wall switch type user interface element that operates in and communicates via the lighting system of FIG. 7.

FIG. 9 is a block diagram of a wall type user interface element 915 that operates in and communicates via the lighting system 702 of FIG. 7. Wall type user interface (UI) element (UI element) is an integrated wall switch that generally includes a power supply 905 driven by a power source 900. Power supply 905 receives power from the power source 900, such as an AC mains, battery, solar panel, or any other AC or DC source. Power supply 905 may include a magnetic transformer, electronic transformer, switching converter, rectifier, or any other similar type of circuit to convert an input power signal into a power signal suitable for the UI element 915.

UI element 915 furthers includes an intelligent LED driver circuit 910, coupled to LED (s) 920 and drives that LED light source (LED) 920 by regulating the power to LED 820 by providing a constant quantity or power to LED 920 as its electrical properties change with temperature, for example. The intelligent LED driver circuit 910 includes a driver circuit that provides power to LED 920 and a pilot LED 917. Intelligent LED driver circuit 910 may be a constant-voltage driver, constant-current driver, or AC LED driver type circuit that provides dimming through a pulse width modulation circuit and may have many channels for separate control of different LEDs or LED arrays. An example of a commercially available intelligent LEI) driver circuit 910 is manufactured by EldoLED.

LED driver circuit 910 can further include an AC or DC current source or voltage source, a regulator, an amplifier (such as a linear amplifier or switching amplifier), a buck, boost, or buck/boost converter, or any other similar type of circuit or component. LEI) driver circuit 910 outputs a variable voltage or current to the LED light source 920 that may include a DC offset, such that its average value is nonzero, and/or an AC voltage.

The UI element 915 includes power distribution circuitry 925 and a micro-control unit (MCU) 930. As shown, MCU 930 is coupled to LED driver circuit 910 and controls the light source operation of the LED 920. MCU 930 includes a memory 922 (volatile and non-volatile) and a central processing unit (CPU) 923. The memory 922 includes a lighting application 927 (which can be firmware) for both occupancy detection and lighting control operations. The power distribution circuitry 925 distributes power and ground voltages to the MCU 930, wireless transmitter 908 and wireless receiver 910, to provide reliable operation of the various circuitry on the UI element 915 chip.

The UI element 915 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the UI element 915 has a radio set that includes radio transmitter 908 as well as a radio receiver 910 together forming a radio transceiver. The wireless transmitter 908 transmits RF signals on the lighting network. This wireless transmitter 908 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the UI element 915 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 930 may be a system on a chip. Alternatively, a system on a chip may include the transmitter 908 and receiver 910 as well as the circuitry of the MCU 930.

As shown, the UI element 915 includes a drive/sense circuitry 935, such as an application firmware, drives the occupancy, audio, and photo sensor hardware. The drive/sense circuitry 935 detects state changes (such as change of occupancy, audio or daylight sensor or switch to turn lighting on/off, dim up/down or set scene) via switches 965, such as a dimmer switch, set scene switch. Switches 965 can be or include sensors, such as infrared sensors for occupancy or motion detection, an in-fixture daylight sensor, an audio sensor, a temperature sensor, BLE signal sensor (i.e. detecting presence of a phone), manual operation of lighting control (i.e. someone walking into a dark room turning on lights), microphone signal, voice command (a la Alexa), and any other signal or sensor data that can establish the presence of a person in the room. Switches 965 may be based on Acuity Brands Lighting's commercially available xPoint® Wireless ES7 product.

Also, as shown, the MCU 930 includes programming in the memory 922. A portion of the programming configures the CPU (processor) 923 to detect one of an occupancy or non-occupancy condition in an area in the lighting network, including the communications over one or more wireless communication bands. The programming in the memory 922 includes a real-time operating system (RTOS) and further includes a lighting application 927 which is firmware/software that engages in communications with controlling of the light source based on one of the occupancy or non-occupancy condition detected by the CPU 923. As shown, a drive/sense circuitry detects a state change event. The lighting application 927 programming in the memory 922 carries out lighting control operations over the lighting system 702 of FIG. 7. The programming for the detection of an occupancy or non-occupancy condition in the area may be implemented as part of the RTOS, as part of the lighting application 927, as a standalone application program, or as other instructions in the memory.

Figure 10:
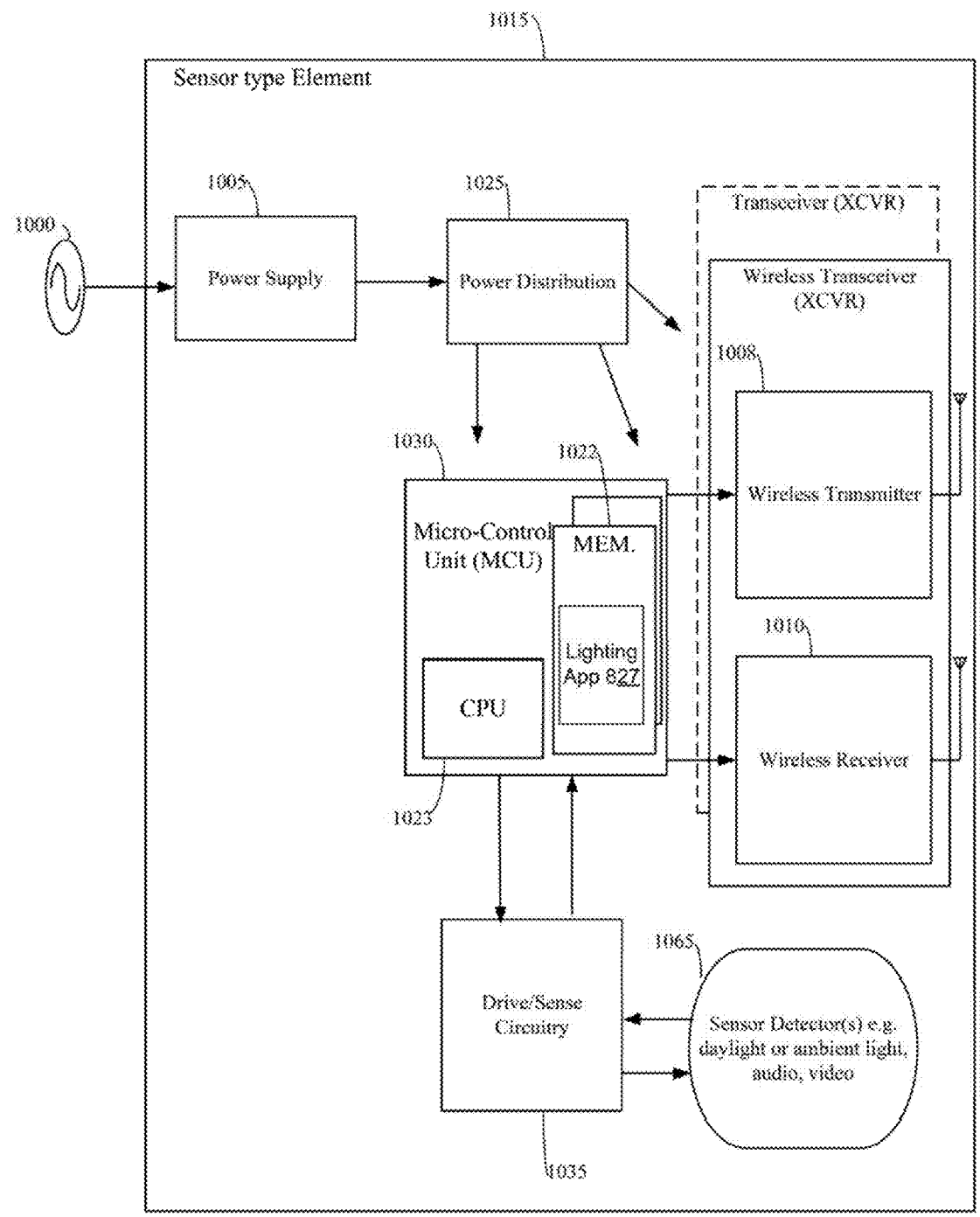
FIG. 10 is a block diagram of an example of a sensor type element that operates in and communicates via the lighting system of FIG. 7.

FIG. 10 is a block diagram of a sensor type element, 1015 that operates in and communicates via the lighting system 702 of FIG. 7. Sensor type element is an integrated sensor detector that generally includes a power supply 1005 driven by a power source 1000. Power supply 805 receives power from the power source 1000, such as an AC mains, battery, solar panel, or any other AC or DC source. Power supply 1005 may include a magnetic transformer, electronic transformer, switching converter, rectifier, or any other similar type of circuit to convert an input power signal into a power signal suitable for the sensor type element 1015.

The sensor type element 1015 includes power distribution circuitry 1025 and a micro-control unit (MCU) 1030. As shown, MCU 1030 includes a memory 1022 (volatile and non-volatile) and a central processing unit (CPU) 1023. The memory 1022 includes a lighting application 1027 (which can be firmware) for both occupancy detection and lighting control operations. The power distribution circuitry 1925 distributes power and ground voltages to the MCU 1030, wireless transmitter 1008 and wireless receiver 1010, to provide reliable operation of the various circuitry on the sensor type element 1015 chip.

The sensor type element 1015 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the sensor type element 1015 has a radio transmitter 1008 as well as radio receiver 1010 together forming a radio transceiver. The wireless transmitter 1008 transmits RF signals on the lighting network. This wireless transmitter 1008 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (rx and Rx) may be provided, for example, for point-to-point communication, over a second different wireless communication bands, e.g. for communication of information other than the control and systems operations information, concurrently with at least some communications over the first wireless communication band. Optionally, the luminaire sensor type element 1015 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 1030 may be a system on a chip. Alternatively, a system on a chip may include the transmitter 1008 and the receiver 1010 as well as the circuitry of the MCU 830.

As shown, the sensor type element 1015 includes a drive/sense circuitry 1035, such as an application firmware, drives the occupancy, daylight, audio, and photo sensor hardware. The drive/sense circuitry 1035 detects state changes (such as change of occupancy, audio or daylight) via sensor detector(s) 1065, such as occupancy, audio, daylight, temperature or other environment related sensors. Sensors 1065 may be based on Acuity Brands Lighting's commercially available xPoint® Wireless ES7 product.

Also as shown, the MCU 1030 includes programming in the memory 1022. A portion of the programming configures the CPU (processor) 1023 to detect one of an occupancy or non-occupancy condition in an area in the lighting network, including the communications over one or more different wireless communication bands. The programming in the memory 1022 includes a real-time operating system (RTOS) and further includes a lighting application 1027 which is firmware/software that engages in communications with controlling of the light source based on one of the occupancy or non-occupancy condition detected by the CPU 1023. The lighting application 1027 programming in the memory 1022 carries out lighting control operations over the lighting system 702 of FIG. 7. The programming for the detection of an occupancy or non-occupancy condition in the area may be implemented as part of the RTOS, as part of the lighting application 1027, as a standalone application program, or as other instructions in the memory.

Figure 11:
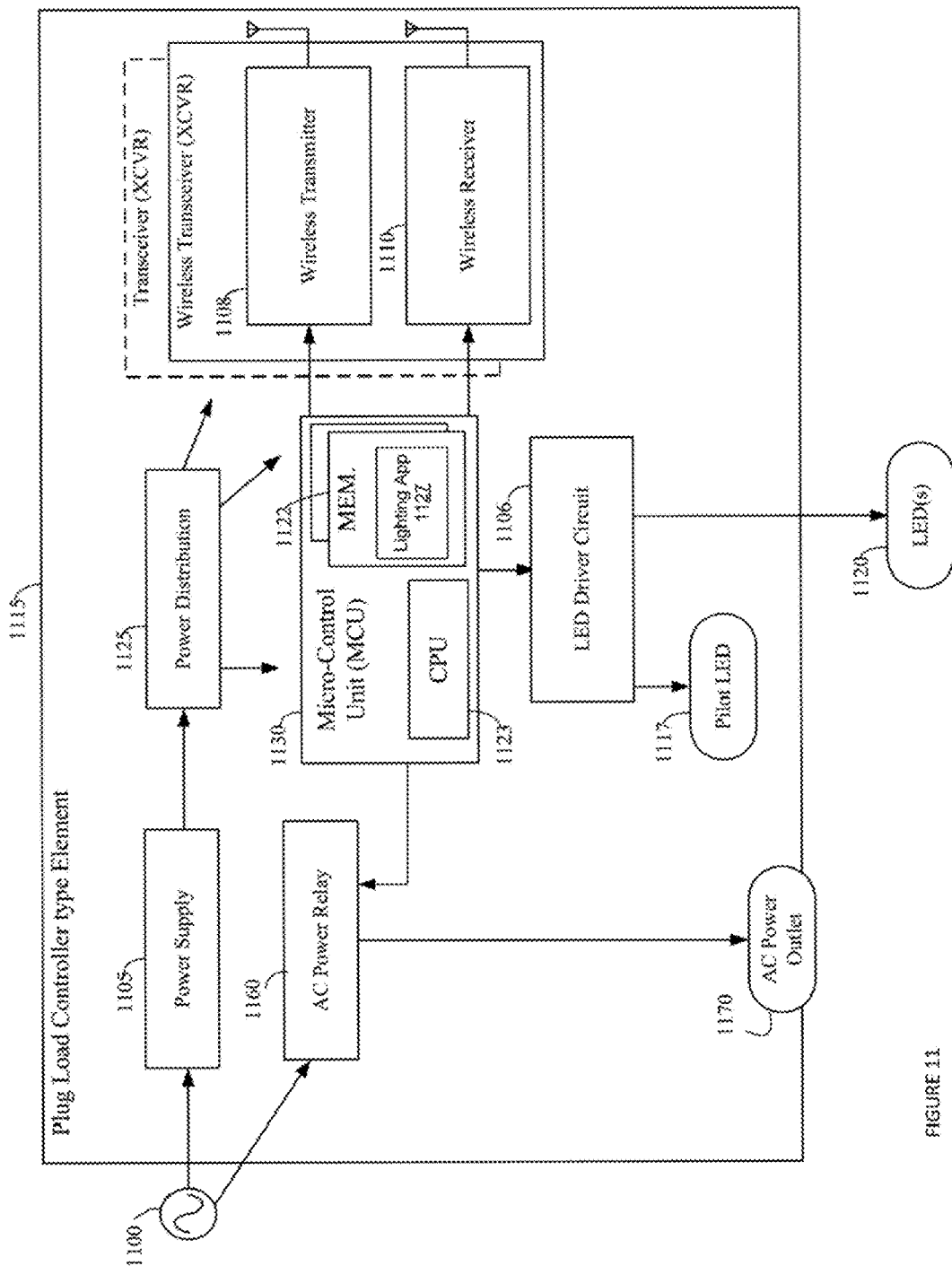
FIG. 11 is a block diagram of an example of a plug load controller type element that operates in and communicates via the lighting system of FIG. 7.

FIG. 11 is a block diagram of a plug load controller type element (plug load element) 1115 that operates in and communicates via the lighting system 702 of FIG. 7. In one example, plug load element 1115 is an integrated switchable power connector that generally includes a power supply 1105 driven by a power source 1100. Power supply 1105 receives power from the power source 1100, such as an AC mains, battery, solar panel, or any other AC or DC source. Power supply 1105 may include a magnetic transformer, electronic transformer, switching converter, rectifier, or any other similar type of circuit to convert an input power signal into a power signal suitable for the plug load element 1115.

Plug load element 1115 includes an intelligent LED driver circuit 1110, coupled to LED (s) 1120 and drives that LED light source (LED) by regulating the power to LED 1120 by providing a constant quantity or power to LED 1120 as its electrical properties change with temperature, for example. The intelligent LED driver circuit 1110 includes a driver circuit that provides power to LED 1120 and a pilot LED 1117. Intelligent LED driver circuit 1110 may be a constant-voltage driver, constant-current driver, or AC LED driver type circuit that provides dimming through a pulse width modulation circuit and may have many channels for separate control of different LEDs or LED arrays. An example of a commercially available intelligent LEI) driver circuit 1110 is manufactured by EldoLED.

LED driver circuit 1110 can further include an AC or DC current source or voltage source, a regulator, an amplifier (such as a linear amplifier or switching amplifier), a buck, boost, or buck/boost converter, or any other similar type of circuit or component. LED driver circuit 1110 outputs a variable voltage or current to the LED light source 1120 that may include a IDC offset, such that its average value is nonzero, and/or an AC voltage.

The plug load element 1115 includes power distribution circuitry 1125 and a micro-control unit (MCU) 1130. As shown, MCU 1130 is coupled to LED driver circuit 110 and controls the light source operation of the LED 1120. MCU 1130 includes a memory 1122 (volatile and non-volatile) and a central processing unit (CPU) 1123. The memory 1122 includes a lighting application 1127 (which can be firmware) for both occupancy detection and lighting control operations. The power distribution circuitry 1125 distributes power and ground voltages to the MCU 1130, wireless transmitter 1108 and wireless receiver 1110, to provide reliable operation of the various circuitry on the plug load control 1115 chip.

The plug load element 1115 also includes a wireless radio communication interface system configured for two way wireless communication on at least one band. Optionally, the wireless radio communication interface system may be a dual-band system. It should be understood that "dual-band" means communications over two separate RF bands. The communication over the two separate RF bands can occur simultaneously (concurrently); however, it should be understood that the communication over the two separate RF bands may not actually occur simultaneously.

In our example, the plug load element 1115 has a radio set that includes radio transmitter 1108 as well as a radio receiver 1110 forming a radio transceiver. The wireless transmitter 1108 transmits RF signals on the lighting network. This wireless transmitter 1108 wireless communication of control and systems operations information, during luminaire operation and during transmission over the first wireless communication band. The wireless receiver carries out receiving of the RF signals from other system elements on the network and generating RSSI data based on signal strengths of the received RF signals. If provided (optional) another transceiver (Tx and Rx) may be provided, for example, for point-to-point communication, over a second different wireless communication bands, e.g. for communication of information other than the control and systems operations information, concurrently with at least some communications over the first wireless communication band. Optionally, the plug load element 1115 may have a radio set forming a second transceiver (shown in dotted lines, transmitter and receiver not separately shown).

The included transceiver (solid lines), for example, may be a sub GHz transceiver or a Bluetooth transceiver configured to operate in a standard GHz band. A dual-band implementation might include two transceivers for different bands, e.g. for a sub GHz band and a GHz band for Bluetooth or the like. Additional transceivers may be provided. The particular bands/transceivers are described here by way of non-limiting example, only.

If two bands are supported, the two bands may be for different applications, e.g. lighting system operational communications and system element maintenance/commissioning. Alternatively, the two bands may support traffic segregation, e.g. one band may be allocated to communications of the entity owning/operating the system at the premises whereas the other band may be allocated to communications of a different entity such as the system manufacturer or a maintenance service bureau.

The MCU 1130 may be a system on a chip. Alternatively, a system on a chip may include the transmitter 1108 and the receiver 1110 as well as the circuitry of the MCU 1130.

Plug load element 1115 plugs into existing AC wall outlets, for example, and allows existing wired lighting devices, such as table lamps or floor lamps that plug into a wall outlet, to operate in the lighting system. The plug load element 1115 instantiates the table lamp or floor lamp by allowing for commissioning and maintenance operations and processes wireless lighting controls in order to the allow the lighting device to operate in the lighting system. Plug load element 1115 further comprises an AC power relay 1160 which relays incoming AC power from power source 1100 to other devices that may plug into the receptacle of plug load element 1115 thus providing an AC power outlet 1170.

Also, as shown, the MCU 1130 includes programming in the memory 1122. A portion of the programming configures the CPU (processor) 1123 to detect one of an occupancy or non-occupancy condition in an area in the lighting network, including the communications over one or more wireless communication bands. The programming in the memory 1122 includes a real-time operating system (RTOS) and further includes a lighting application 1127 which is firmware/software that engages in communications with controlling of the light source based on one of the occupancy or non-occupancy condition detected by the CPU 1123. As shown, a drive/sense circuitry detects a state change event.

The lighting application 1127 programming in the memory 1122 carries out lighting control operations over the lighting system 702 of FIG. 7. The programming for the detection of an occupancy or non-occupancy condition in the area may be implemented as part of the RTOS, as part of the lighting application 1127, as a standalone application program, or as other instructions in the memory.

Aspects of heuristic methods of detecting occupancy and non-occupancy condition in a lighting system as described above may be embodied in programming, e.g. in the form of software, firmware, or microcode executable by a processor of any one or more of the lighting system nodes, or by a processor of a portable handheld device, a user computer system, a server computer or other programmable device in communication with one or more nodes of the lighting system. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into a platform such as one of the controllers of FIGS. 2, 4, 7-10. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible or non-transitory storage medium, a carrier wave medium or physical transmission medium. Non-volatile storage media include, for example, optical or magnetic disks, such as any of the storage hardware in any computer(s), portable user devices or the like, such as may be used. Volatile storage media include dynamic memory, such as main memory of such a computer or other hardware platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge (the preceding computer-readable media being "non-transitory" and "tangible" storage media), a carrier wave transporting data or instructions, cables or links transporting such a carrier wave, or any other medium from which a computer can read programming code and/or data. Many of these forms of computer readable media may be involved in carrying data and/or one or more sequences of one or more instructions to a processor for execution.

Program instructions may comprise a software or firmware implementation encoded in any desired language. Programming instructions, when embodied in a machine readable medium accessible to a processor of a computer system or device, render a computer system or a device into a special-purpose machine that is customized to perform the operations specified in the program instructions.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes", "including" or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A lighting system comprising:
a light source;
a plurality of wireless communication transmitters for wireless radio frequency (RF) spectrum transmissions in an area, including RF spectrum transmissions at a plurality of times;
a wireless communication receiver configured to receive RF spectrum signals of transmissions from each of the plurality of transmitters through the area at the plurality of times, wherein the receiver is configured to generate an indicator data of a signal characteristic of the received RF spectrum signal from each of the plurality of transmitters at each of the plurality of times; and
a control module coupled to the light source and coupled to obtain the indicator data of RF spectrum signals generated at each of the plurality of times from the receiver, wherein the control module is configured to:
at each respective one of the plurality of times:
apply one of a plurality heuristic algorithm coefficients to each indicator data from the receiver for the respective time,
based on results of the applications of the coefficients to indicator data, generate an indicator data metric value for each of the indicator data from the receiver for the respective time,
process the indicator data metric values to compute an output value;
compare the output value at each of the plurality of times with a threshold to detect one of an occupancy condition or a non-occupancy condition in the area, and
control the light source in response to the detected one of the occupancy condition or the non-occupancy condition in the area.

2. The lighting system of claim 1, wherein
one or more of the plurality of wireless transmitters is one of a WiFi, blue tooth low energy, Zigbee or ultra wide band transmitter; and
the wireless receiver is one of the WiFi, blue tooth low energy, Zigbee or ultra wide band receiver.

3. The lighting system of claim 1, further comprising a trusted detector, wherein the trusted detector is configured to generate a known occupancy value for the occupancy condition or a known non-occupancy value for the non-occupancy condition for each of the plurality of times.

4. The lighting system of claim 3, wherein the control module is further configured to, at each respective one of the plurality of times, determine a relationship of the detected one of the occupancy condition or the non-occupancy condition in the area with the known occupancy value or the known non-occupancy value generated by the trusted detector during the respective one of the plurality of times.

5. The lighting system of claim 4, further comprising a learning module coupled to the control module, wherein the learning module is configured to:
determine whether the plurality of the coefficients are optimized coefficients at each of the plurality of times based on the determined relationship during the plurality of times.

6. The lighting system of claim 5, wherein upon determination of the plurality of the coefficients as the optimized coefficients, the learning module is configured to instruct the control module to utilize the optimized coefficients to apply to each indicator data from the receiver for detection of the occupancy condition or the non-occupancy condition in the area in real time.

7. The lighting system of claim 5, wherein upon determination of the plurality of the coefficients as not the optimized coefficients, the learning module is configured to update one or more of the plurality of coefficients and instruct the control module to utilize the updated one or more in a next time.

8. The lighting system of claim 7, wherein the control module is further configured to:
at each respective one of a plurality of times after the update:
apply coefficients including the one or more updated coefficients to each indicator data from the receiver for the respective time after the update,
based on results of the applications of the coefficients including the one or more updated coefficients to indicator data, generate an updated indicator data metric value for each of the indicator data from the receiver for the respective time after the update, and
process each of the updated indicator data metric value for each of the indicator data to compute an updated output value; and
compare the updated output value at each of the plurality of times after update with the threshold to detect one of one of an occupancy condition or a non-occupancy condition in the area.

9. The lighting system of claim 1, wherein the control module is configured to: at each respective one of the plurality of times:
(a) apply one of an another plurality of heuristic algorithm coefficients to the indicator data of signals received from the transmitters, generated by the receiver, for the respective time, wherein the another coefficients are different from the coefficients, and
(b) based on results of the application of the another coefficients to the indicator data, generate an another indicator data metric value for the indicator data generated by the receiver for the respective time, wherein the another indicator data metric value is different from the indicator data metric value,
(ii) process the another indicator data metric values to compute an another output value for the receiver, wherein the another output value is different from the another output value; and
(iii) compare the another output value at the respective time with an another threshold to detect one of a one of an occupancy condition or a non-occupancy condition of a region in the area.

10. The lighting system of claim 1, wherein the indicator data is one of a relative signal strength indicator (RSSI) data, bit error rate data, packet error rate data, or a phase change data, or a combination of two or more thereof.

11. The lighting system of claim 10, wherein:
the indicator data is a relative signal strength indicator (RSSI) data, the plurality of coefficients comprise a set of coefficients and an independent coefficients and the control module utilizes a logistic regression technique, wherein to apply a plurality of the coefficients to the RSSI data, the control module to:
compute a product value of one of a plurality of coefficients with the corresponding RSSI data to generate a RSSI data metric value for each of the RSSI data from the receiver.

12. The lighting system of claim 11, wherein to compute the output value, the control module to:
add each of the product values for the receiver and the independent coefficient to compute a single added value, wherein the independent coefficient is different from each of the plurality of coefficients;
compute an exponent of the single added value to generate an exponent value;
add a digit of 1 to the exponent value to generate an added exponent value; and
divide a digit of 1 with the added exponent value.

13. The lighting system of claim 1, wherein:
the control module is a neural network module, the neural network module comprise:
an input layer having a plurality of input nodes, each of the plurality of input nodes include an indicator data among the plurality of indicator data;
a middle layer having a plurality of middle nodes, each of the middle nodes is coupled to each of the plurality of input nodes; and
an output node coupled to each of the plurality of middle nodes.

14. The lighting system of claim 13, wherein the indicator data is a relative signal strength indicator (RSSI) data and the plurality of coefficients comprise a set of weights and a set of bias constants, wherein to apply a plurality of the coefficients to the RSSI data, the neural network module to apply a forward propagation function, wherein the forward propagation function comprise:
at each of the plurality of middle nodes:
receive from each of the input nodes among the plurality of input nodes, a corresponding RSSI data among the plurality of RSSI data;
apply a set of weights and a set of bias constants to each of the RSSI data, wherein to apply, each of the plurality of middle nodes to:
compute a product value of each weight among the set of weights with one of the RSSI data among the plurality of the RSSI data to generate a RSSI data metric value for each of the RSSI data from the receiver, wherein the weight is a connection between an input node and a corresponding middle node;
add each product value with a corresponding bias constant among the set of bias constants to generate a plurality of constant values; and
sum each of the plurality constant values to generate the single propagation value.

15. The lighting of claim 14, wherein to compute the output value, the neural network module to:
at the output node:
apply an activation function to the single propagation value.

16. The lighting system of claim 15, wherein the neural network module to:

update one or more weights among the set of weights to generate updated set of weights.

17. The lighting system of claim 16, wherein the neural network module to:
update one or more bias constants among the set of bias constants to generate updated set of bias constants.

18. The lighting system of claim 17, wherein the neural network module to:
apply a backward propagation function utilizing one of the updated weights or the updated bias constants, wherein the backward propagation function comprise:
provide, at the output node, one of the updated weights or the updated bias constants; and
apply, at each of the plurality of middle nodes, one of the updated weights or the updated bias constants.

19. The lighting system of claim 17, wherein the neural network module to:
apply a backward propagation function utilizing the updated weights and the updated bias constants, wherein the backward propagation function comprise:
provide, at the output node, the updated weights and the updated bias constants; and
apply, at each of the plurality of middle nodes, the updated weights and the updated bias constants.

20. The lighting system of claim 1, wherein the control module to detect one of the occupancy condition or the non-occupancy condition in a sub-area within the area.

21. The lighting system of claim 20, wherein the control module to reject the indicator data of RF spectrum signals generated by the receiver located outside of the sub-area and within the area.

22. The lighting system of claim 20, wherein the control module to reject the indicator data generated by the receiver of the RF spectrum signals received from a transmitter among the plurality of transmitters located outside of the sub-area and within the area.

23. A method comprising steps of:
obtaining, in a lighting system, an indicator data generated at each of a plurality of times from a receiver configured to receive radio frequency (RF) spectrum signals from a plurality of RF transmitters in an area,
at each respective one of the plurality of times in the lighting system:
applying a plurality of heuristic algorithm coefficients (coefficients) to each of the indicator data from the receiver for the respective time,
based on results of the applications of the coefficients to indicator data, generating an indicator data metric value for each of the indicator data from the receiver for the respective time,
processing the indicator data metric values to compute an output value for the respective time,
comparing the output value for the respective time with a threshold to detect one of an occupancy condition or a non-occupancy condition in the area, and
controlling the light source in response to the detected one of the occupancy condition or the non-occupancy condition in the area.

24. The method of claim 23, wherein the comparing step comprises determining, at each of the respective one of the plurality of times, a relationship of the detected one of the occupancy condition or the non-occupancy condition in the area with a known occupancy value for the occupancy condition or a known non-occupancy value for the non-occupancy condition during the respective one of the plurality of times.

25. The method of claim 24, further comprising determining whether the plurality of the coefficients are optimized coefficients at each of the plurality of times based on the determined relationship during the plurality of times.

26. The method of claim 25, wherein upon determination of the plurality of the coefficients as the optimized coefficients, utilizing the optimized coefficients to apply to each indicator data for detection of the occupancy condition or the non-occupancy condition in the area in real time.

27. The method of claim 25, wherein upon determination of the plurality of the coefficients as not the optimized coefficients, updating one or more of the plurality of coefficients.

28. The method of claim 27, wherein
at each respective one of the plurality of times after the update:
applying the coefficients including the one or more updated coefficients to each indicator data from the receiver for the respective time after the update,
based on results of the applications of the coefficients including the one or more updated coefficients to indicator data, generating an updated indicator data metric value for each of the indicator data from the receiver for the respective time after the update, and
processing the updated indicator data metric values to compute an updated output value; and
comparing the updated output value at each of the plurality of times after the update with the threshold to detect one of an occupancy condition or a non-occupancy condition in the area.

29. The method of claim 23, further comprising controlling an operation of a management function in the area based upon comparison of the output value at the respective time with the threshold to detect one of the occupancy condition or the non-occupancy condition in the area.

30. The lighting system of claim 1, wherein the control module is further configured to:
control an operation of a management function in the area based upon comparison of the output value at the respective time with the threshold to detect one of the occupancy condition or the non-occupancy condition in the area.

* * * * *